(12) United States Patent
Wayts

(10) Patent No.: US 12,545,531 B2
(45) Date of Patent: Feb. 10, 2026

(54) CAN BLANK CONVEYOR ASSEMBLY AND METHOD OF USE

(71) Applicant: Air Con Tech Systems, Inc., East Rochester, OH (US)

(72) Inventor: Thomas Wayts, East Rochester, OH (US)

(73) Assignee: Air Con Tech Systems, Inc., East Rochester, OH (US)

( * ) Notice: Subject to any disclaimer, the term of this patent is extended or adjusted under 35 U.S.C. 154(b) by 114 days.

(21) Appl. No.: 18/520,726

(22) Filed: Nov. 28, 2023

(65) Prior Publication Data

US 2025/0171252 A1 May 29, 2025

(51) Int. Cl.
*B65G 51/03* (2006.01)

(52) U.S. Cl.
CPC ...... *B65G 51/03* (2013.01); *B65G 2201/0252* (2013.01); *B65G 2812/16* (2013.01)

(58) Field of Classification Search
None
See application file for complete search history.

(56) References Cited

U.S. PATENT DOCUMENTS

| | | | | |
|---|---|---|---|---|
| 5,037,245 A * | 8/1991 | Smith | | B65G 51/03 406/88 |
| 5,145,292 A * | 9/1992 | Bulso, Jr. | | B30B 15/32 406/88 |
| 5,611,647 A * | 3/1997 | Ouellette | | B65G 15/14 406/182 |
| 6,685,401 B1 * | 2/2004 | de Almeida Rodrigues | | B65G 51/035 406/84 |
| 7,223,060 B2 * | 5/2007 | Weidenmuller | | B29C 35/16 414/676 |
| 8,376,663 B2 * | 2/2013 | Erceg | | B65G 11/203 414/676 |
| 10,654,664 B1 * | 5/2020 | Green | | B65G 25/08 |
| 12,134,530 B2 * | 11/2024 | Ruddell | | G07F 17/3216 |
| 12,207,435 B2 * | 1/2025 | Chia | | G06F 1/20 |
| 2007/0287119 A1 * | 12/2007 | Lyons | | B65G 51/03 432/242 |
| 2009/0290942 A1 * | 11/2009 | Delaporte | | B65G 51/035 406/88 |
| 2016/0268153 A1 * | 9/2016 | Wada | | B65G 49/065 |
| 2025/0051105 A1 * | 2/2025 | Lowrey | | B65G 51/03 |

FOREIGN PATENT DOCUMENTS

JP      4896148 B2 *  3/2012  ....... H01L 21/67784

* cited by examiner

Primary Examiner — Joseph A Dillon, Jr.
(74) Attorney, Agent, or Firm — Sand, Sebolt & Wernow Co., LPA

(57) ABSTRACT

A system of can blank conveyor assemblies for transporting a plurality of can blanks along the corresponding tray via the at least one set of air directors. The system includes a plurality of trays where each tray of the plurality of trays. The system also includes a plurality of air supply units removably engaged with the plurality of trays at first ends of the plurality of trays and being in fluid communication with the tray passageways. Each air supply unit of the plurality of air supply units comprises at least a housing operably engaged with the tray, and a fan unit that is disposed inside of the housing and that is adapted to supply air at a predetermined rate from the housing and into a corresponding tray to convey a plurality of can blanks along the corresponding tray via the at least one set of air directors.

15 Claims, 15 Drawing Sheets

CAN BLANK CONVEYOR ASSEMBLY AND METHOD OF USE

TECHNICAL FIELD

This disclosure is directed to a can blank conveyor assembly having a portable and/or compact air supply unit.

BACKGROUND ART

In the manufacturing industries, conveyor systems and machines have been commonly placed in operation for transporting and/or moving various types of products immediately after being cut or stamped by a machine. In one instance, belt driven systems are used in manufacturing industries to rapidly transport products and/or goods that have various shapes, sizes, and/or configurations. However, certain industries, such as food and beverage industries, may be unable to use this technology due to specific government restrictions or laws instituted in these industries.

To combat against these issues, food industries, beverage industries, and other regulated industries of the like rely upon air conveyor system and systems of the like instead of using belt driven system. Such use of these air conveyor system are desired due to the use of sturdy stainless steel, lack of moving parts to transport products or goods, and other necessities that conform to specific government requirements or laws.

While such air conveyor systems are desirable, these air conveyor systems require vast amount of air lines that are connected with conveyor trays and fan units for delivering air to said conveyor trays. With such configuration, operators or maintenance technicians of these systems must check multiple locations of a given air conveyor if said air conveyor is malfunctioning or is in need of routine service or repair, including damaged or worn air lines that span across a building between the conveyor and the fan unit, damaged or worn fan units, and other various components that are part of an air conveyor. With such arrangement of these components, the labor and time of repairing or servicing these conventional air conveyor systems dramatically increase due to the operators or maintenance technicians of these systems being required to travel to multiple locations away from the conveyor. With such increase in labor and time, corporations or entities having these conventional air conveyor systems must account for higher costs and expenses in operating, servicing, and repairing these systems. With such increase in labor and time, corporations or entities having these conventional air conveyor systems must also account for longer down times or shutdown time when operators or maintenance technicians of these systems are servicing or repairing these systems.

SUMMARY OF THE INVENTION

In one aspect, an exemplary embodiment of the present disclosure may provide a system of can blank conveyor assemblies. The system includes a plurality of trays where each tray of the plurality of trays comprises at least: a first end; a second end longitudinally opposite to the first end; a tray passageway defined between the first end and the second end; and at least one of set of air directors positioned longitudinally between the first end and the second end and being in fluid communication with the tray passageway. The system also includes a plurality of air supply units that is removably engaged with the plurality of trays at the first ends and being in fluid communication with the tray passageways. Each air supply unit of the plurality of air supply units comprises at least: a housing operably engaged with the tray; and a fan unit disposed inside of the housing that is adapted to supply air at a predetermined rate from the housing and into a corresponding tray to convey a plurality of can blanks along the corresponding tray via the at least one set of air directors.

This exemplary embodiment or another exemplary embodiment may further include at least one spare air supply unit remote from the plurality of trays; wherein the at least one spare air supply unit is replaceable with an inoperative air supply unit while remaining air supply units of the can blank conveyors remain in an operative state to convey the plurality of can blanks. This exemplary embodiment or another exemplary embodiment may further include that each air supply unit of the plurality of air supply units is entirely suspended from the corresponding tray of the plurality of the trays at a single point of support. This exemplary embodiment or another exemplary embodiment may further include that the housing of each air supply unit of the plurality of air supply units further comprises: an outlet end operably engaged with the tray and defining an outlet opening; an inlet end vertically opposite to the outlet end and defining an inlet opening; and a passageway that is defined between the outlet end and the inlet end and is accessible at the outlet opening and the inlet opening; wherein the fan unit draws the air into the passageway through the inlet end and exerts the air through the outlet end. This exemplary embodiment or another exemplary embodiment may further include that each air supply unit of the plurality of air supply units further comprises: an inlet cone positioned vertically below the fan unit inside of the housing and vertically aligned with the fan unit; and an outlet cone positioned vertically above and vertically aligned with the inlet cone and the fan unit; wherein the inlet cone is configured to direct the air into the fan unit in a first direction, and wherein the outlet cone is configured to direct the air exerted from the fan unit at a second direction different than the first direction. This exemplary embodiment or another exemplary embodiment may further include that the inlet cone comprises: a frame having an exterior wall operably engaged with the housing and an interior wall opposite to the exterior wall and free from engaging with the housing; at least one support arm operably engaged with and extending from the interior wall; and a deflector operably engaged with the at least one support arm and positioned entirely inside of the frame. This exemplary embodiment or another exemplary embodiment may further include that the inlet cone further comprises: an inlet end of the deflector spaced apart from the fan unit; an outlet end of the deflector opposite to the inlet end and positioned directly vertically below the fan unit; and a deflecting wall of the deflector that extends outwardly from the inlet end to the outlet end such that an outlet diameter defined at the outlet end is greater than an inlet diameter defined at the inlet end. This exemplary embodiment or another exemplary embodiment may further include that the deflecting wall defines an arcuate shape. This exemplary embodiment or another exemplary embodiment may further include that the outlet cone comprises: a frame having an exterior wall operably engaged with the housing and an interior wall opposite to the exterior wall and free from engaging with the housing; at least one support arm operably engaged with and extending from the interior wall; and a deflector operably engaged with the at least one support arm; wherein a portion of the deflector is positioned entirely outside of the outer frame. This exemplary embodiment or another exemplary embodiment may further include that the outlet cone further comprises: an inlet end of the deflector positioned directly vertically above the fan unit; an outlet end of the deflector opposite to the inlet end that is spaced apart from the fan unit and outside of the frame; and a deflecting wall that extends outwardly from the inlet end to the outlet end such that an inner diameter defined at the inlet end is greater than an outer diameter defined at the outlet end. This exemplary embodiment or another exemplary embodiment may further include that the outlet cone further comprises: a first portion defined between the inlet end and a location between the inlet end and the outlet end and operably engages with the at least one support arm; and a second portion defined between the outlet end and the location between the inlet end and the outlet end and is free from engaging with the at least one support arm; wherein the first portion is disposed inside of the outer frame and the second portion is disposed outside of the outer frame. This exemplary embodiment or another exemplary embodiment may further include that each air supply unit of the plurality of air supply units further comprises: a guard operably engaged with the housing at the inlet end; wherein the guard allows the air to flow into the passageway at the inlet opening in response to the fan unit drawing the air into the passageway. This exemplary embodiment or another exemplary embodiment may further include a connector releasably engaging each air supply unit of the plurality of air supply units with the corresponding tray of the plurality of the trays; wherein the connector surrounds a portion of the housing of the air supply unit and an inlet tube of the tray. This exemplary embodiment or another exemplary embodiment may further include that the connector further comprises: a sleeve operably engaging with and surrounding the portion of the housing of the air supply unit and the inlet tube of the tray; and at least one fastener releasably engaging and surrounding the portion of the housing of the air supply unit, the inlet tube of the tray, and the sleeve with one another. This exemplary embodiment or another exemplary embodiment may further include each tray of the plurality of trays further comprises: a side opening defined proximate to the first end of the tray and providing fluid communication between the tray passageway and the air; and a regulator slidably moveable on the tray via a pair of tracks relative to the side opening; wherein the regulator is configured to regulate the predetermined rate of air that enters into the passageway based on the air exiting through the side opening.

In another aspect, an exemplary embodiment of the present disclosure may provide a method of repairing at least one can blank conveyor of a plurality of can blank conveyors. The method includes steps of: deactivating an air supply unit of the at least one can blank conveyor from an operative state to an inoperative state while air supply units of the remaining can blank conveyors of the plurality of can blank conveyors remain in operative states; disengaging a housing of the air supply unit of the at least one can blank conveyor from a tray of the at least one can blank conveyor, wherein a fan unit of the air supply unit is engaged with and disposed inside of the housing; removing the air supply unit from the tray; introducing a second air supply unit of a plurality of air supply units to the tray; securing a second housing of the second air supply unit with the tray, wherein a second fan unit of the second air supply unit is engaged with and disposed inside of the second housing; and activating the second air supply unit of the at least one can blank conveyor from an inoperative state to an operative state.

This exemplary embodiment or another exemplary embodiment may further include a step of suspending the second air supply unit from an inlet tube of the tray. This exemplary embodiment or another exemplary embodiment may further include that the step of securing a second housing of the second air supply unit with the tray further includes releasably engaging a connector of the conveyor with the second housing of the second air supply unit. This exemplary embodiment or another exemplary embodiment may further include a step of directing air flow from an inlet opening defined in the housing, by an inlet cone, to the second fan unit. This exemplary embodiment or another exemplary embodiment may further include a step of directing air flow from the second fan unit to an outlet opening defined in the housing by an outlet cone.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-10 illustrate a can blank conveyor assembly or a can blank conveyor (hereinafter "conveyor") generally referred to as 1. Conveyor 1 generally includes a first or front end 1A, a second or rear end 1B longitudinally opposite to the front end 1A, and a longitudinal direction defined therebetween. Conveyor 1 also includes a third or top end 1C that is positioned vertically above the front end 1A and the rear end 1B, a fourth or bottom end 1D that is positioned vertically below the front end 1A and the rear end 1B, and a vertical direction defined therebetween. As discussed in greater detail below, conveyor 1 is configured to convey and/or transport a predetermined amount of can blanks from a can blank dispenser to a downstream location or an outlet container in a processing line. As also discussed in greater detail below, conveyor 1 includes a compact and portable air supply unit that is releasably secured with a tray of the conveyor 1 for rapidly repairing and/or replacing the air supply unit of the conveyor 1 as compared to conventional, prior can blank conveyors used in the air conveyor industry. Such component and parts of the conveyor 1 are now discussed in greater detail below.

Figure 2:
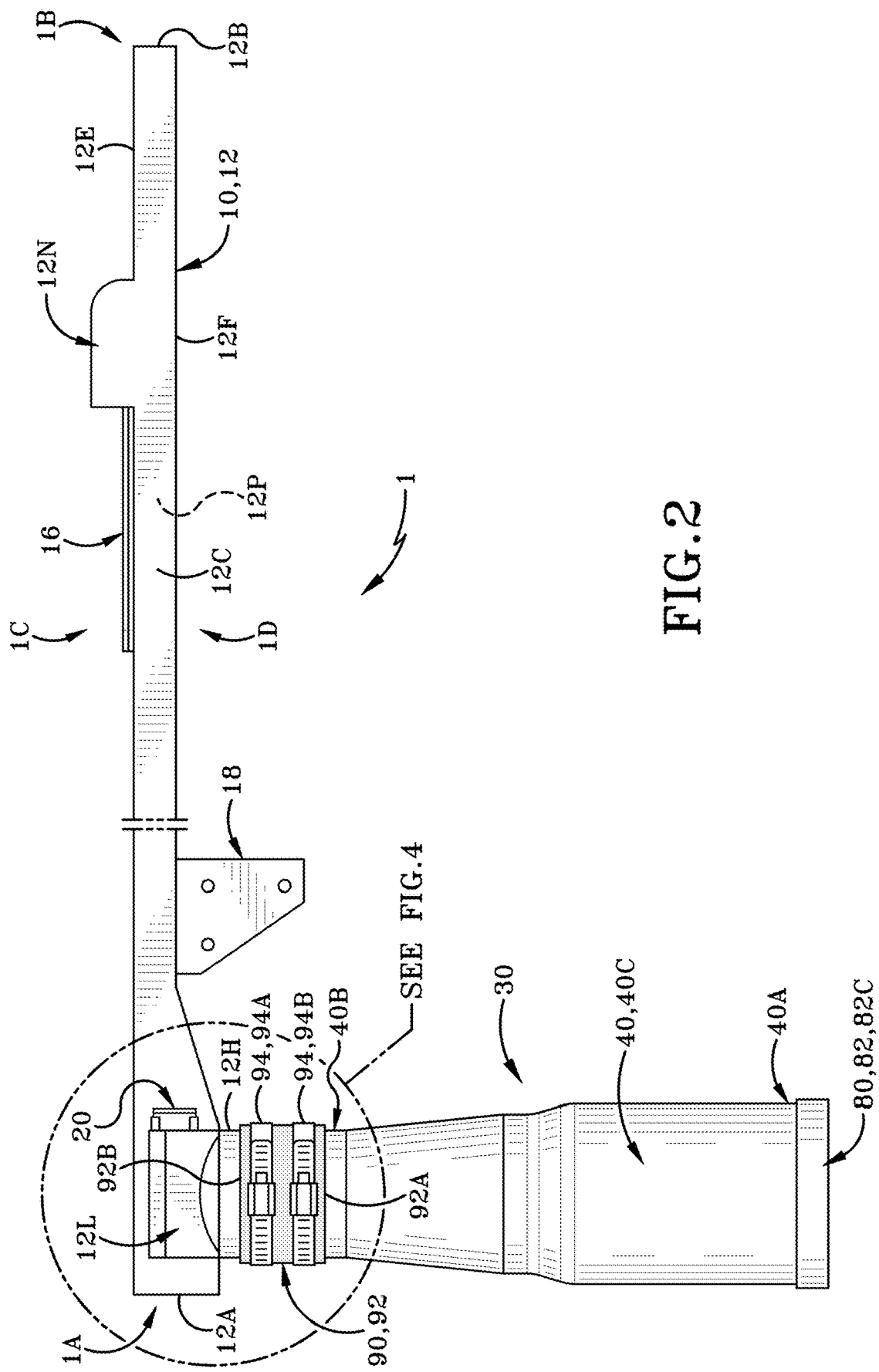
FIG. 2 is a side elevation view of the can blank conveyor.
Figure 3:
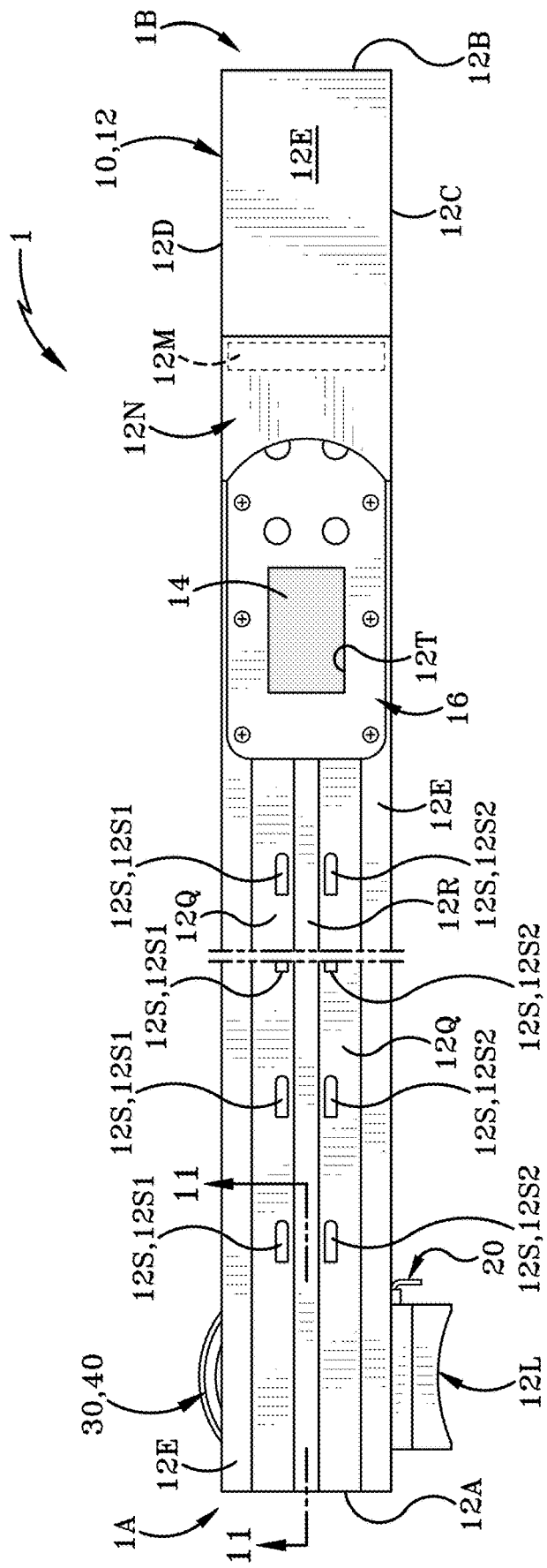
FIG. 3 is a top plan view of the can blank conveyor.

Conveyor 1 includes a tray 10 for receiving can blanks from a can blank dispenser. As best seen in FIGS. 2-3, tray 10 includes a main body 12 that has a front end 12A positioned at the front end 1A of conveyor 1, a rear end 12B longitudinally opposite to the front end 12A and positioned at the rear end 1B of the conveyor 1, and a longitudinal axis defined therebetween. Referring to FIG. 3, main body 12 also includes a first side 12C that extends between the front end 12A and the rear end 12B, a second side 12D that is extends between the front end 12A and the rear end 12B and is transversely opposite to the first side 12C, and a transverse direction defined therebetween. Referring back to FIG. 2, conveyor 1 also includes a top end 12E that is positioned vertically above the front end 12A, the rear end 12B, the first side 12C, and the second side 12D, a bottom end 12F that is positioned vertically below the front end 12A, the rear end 12B, the first side 12C, and the second side 12D and is vertically opposite to the top end 12E, and a vertical direction defined therebetween.

Still referring to main body 12, main body 12 also defines an inlet opening 12G (see FIG. 11) at the bottom end 12F of main body 12 and is positioned at the front end 12A for providing access into the main body 12, which is discussed in greater detail below. Main body 12 also includes an inlet tube 12H that extends downwardly from the bottom end 12F at the inlet opening 12G (see FIGS. 4 and 10). With such configuration, the inlet tube 12H is in fluid communication with the interior space of main body 12 at the inlet opening 12G. As discussed in greater detail below, inlet tube 12H is configured to suspend a compact air supply unit of the conveyor 1 from the main body 12 at the front end 12A of main body 12.

Figure 4:
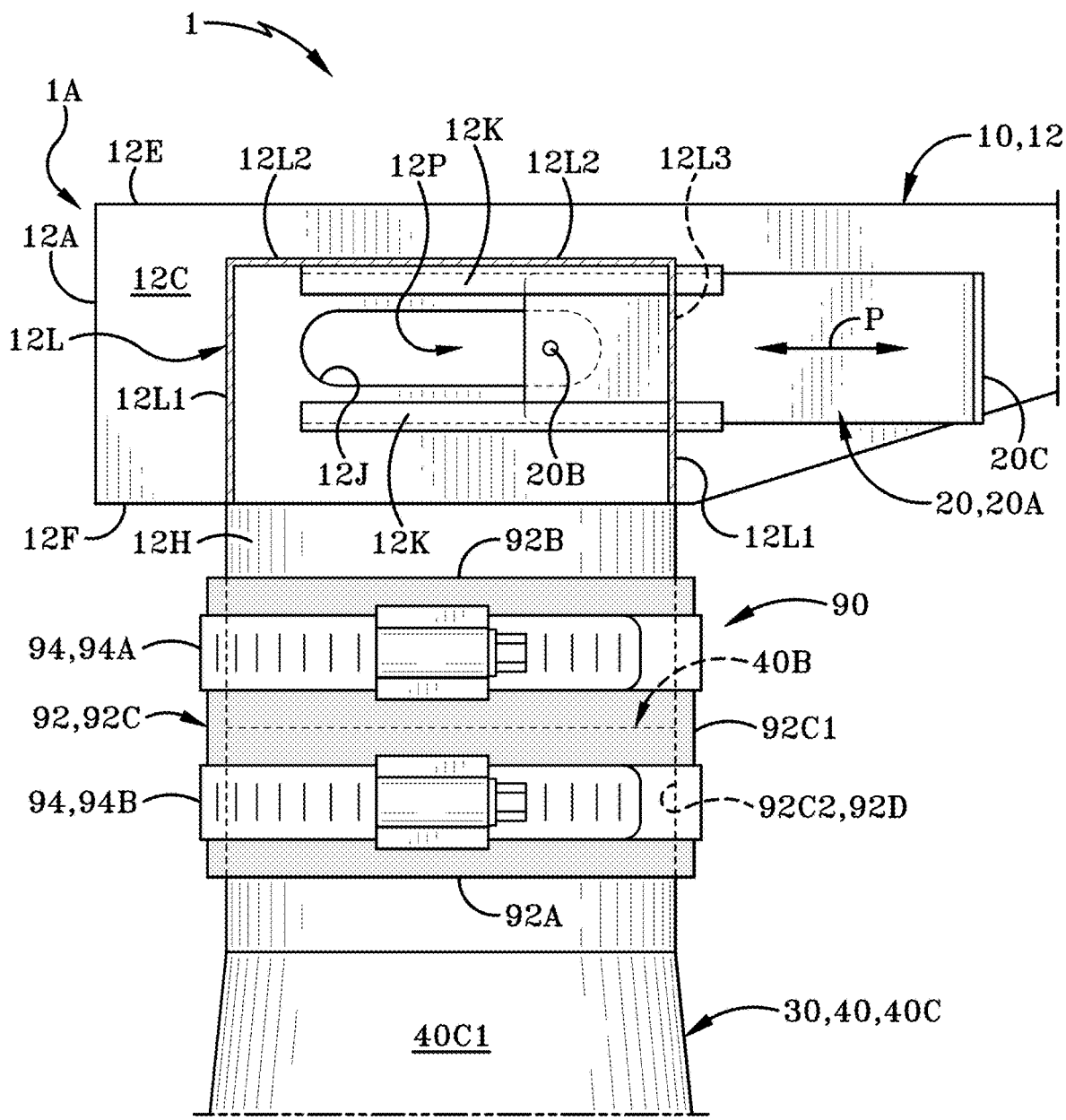
FIG. 4 is an enlargement of the highlighted region shown in FIG. 2.
Figure 5:
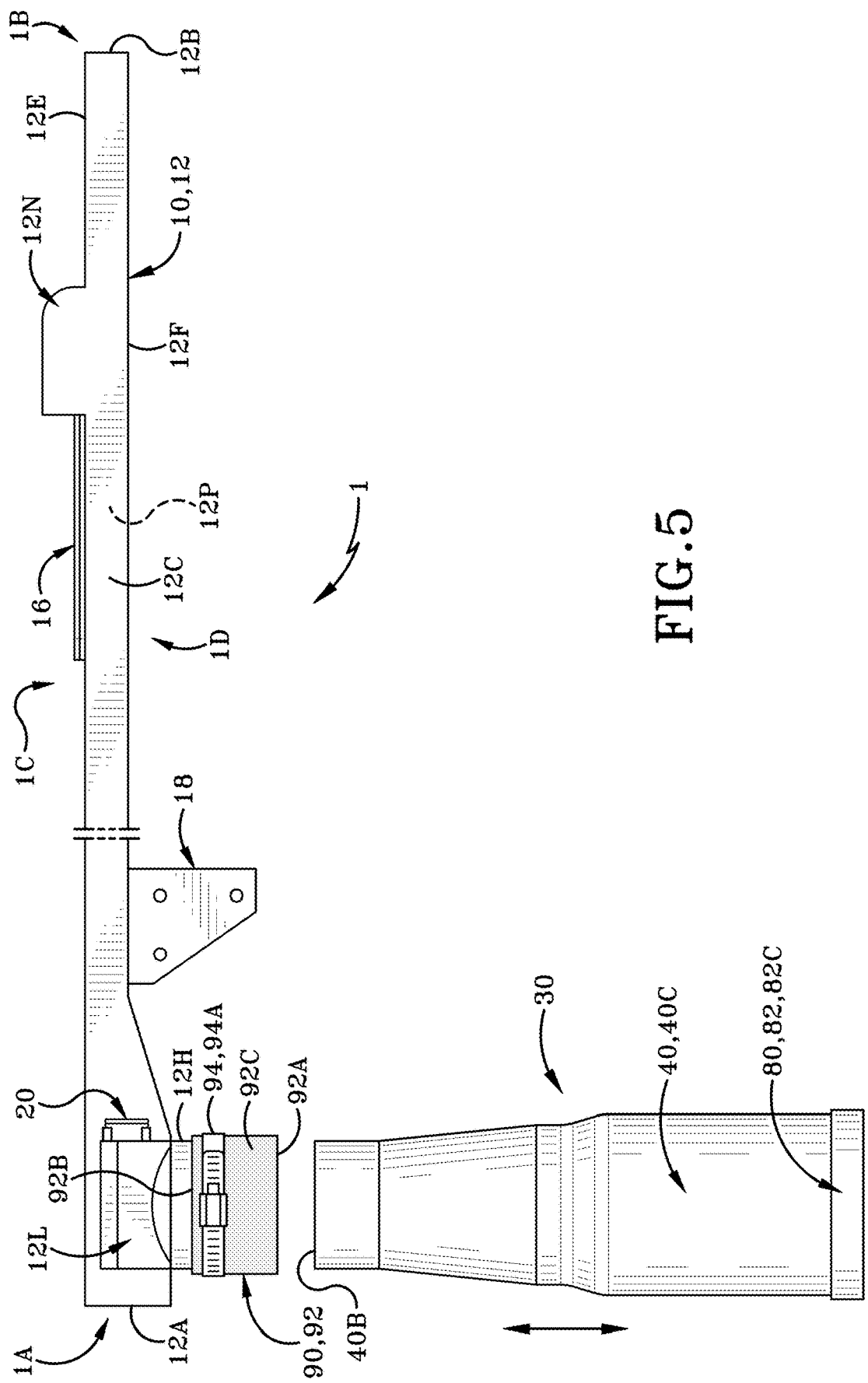
FIG. 5 is an operational view of a compact air supply unit of the can blank conveyor being removed from a tray of the can blank conveyor.
Figure 6:
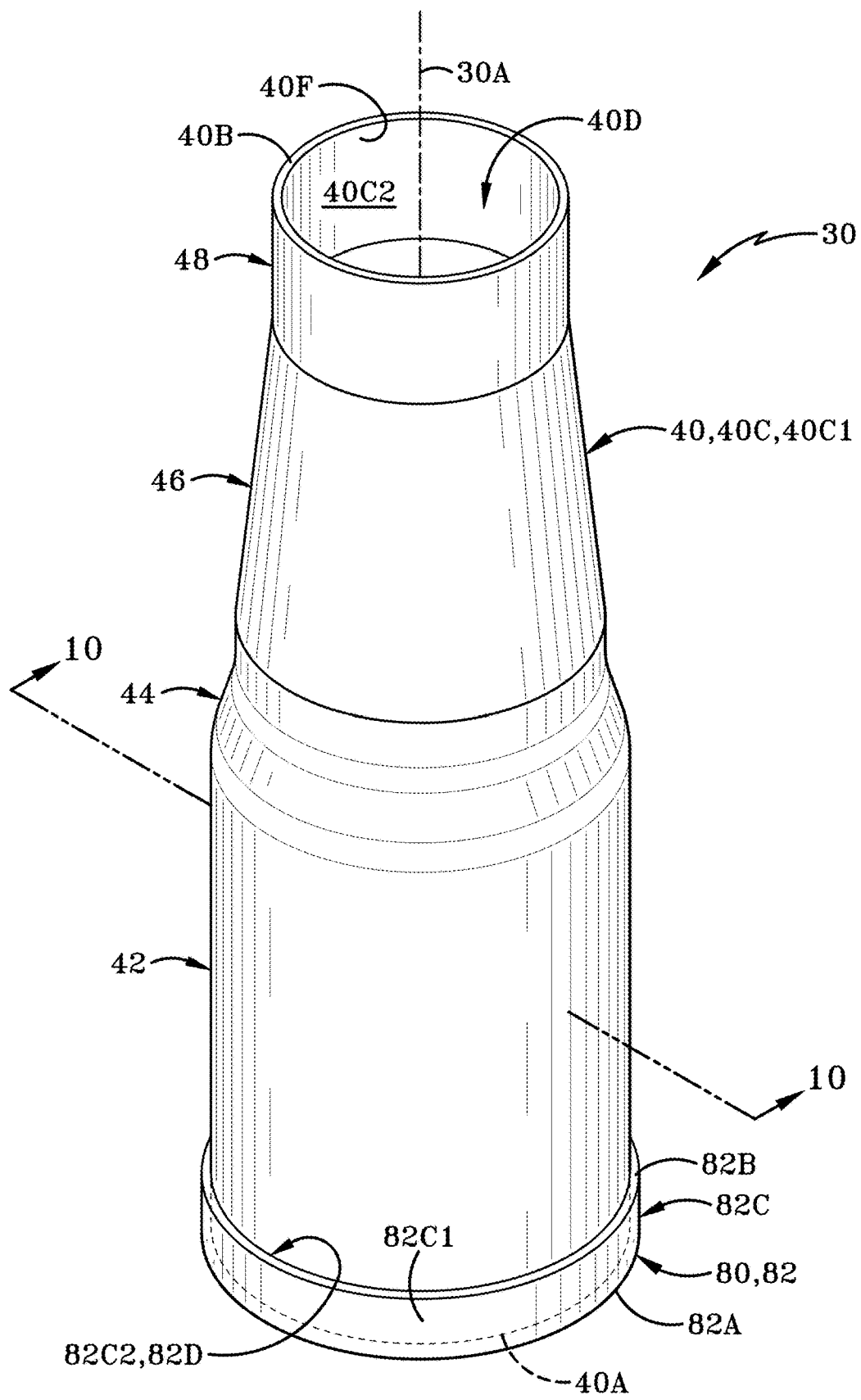
FIG. 6 is a front, top isometric perspective view of the compact air supply unit.

Still referring to main body 12, main body 12 also defines a side opening 12J in the first side 12C and is positioned at the front end 12A (see FIG. 4). The side opening 12J is positioned vertically above the inlet opening 12G while allowing fluid communication with the interior space of main body 12 from an exterior environment surrounding the main body 12; such use and purpose of side opening 12J is discussed in greater detail below. Main body 12 also includes a pair of tracks 12K that operably engages with the first side 12C and surrounds the side opening 12J. In the present disclosure, the pair of tracks 12K is free from interfering with the side opening 12J for while allowing fluid communication with the interior space of main body 12 and the exterior environment surrounding the main body 12; such use and purpose of pair of tracks 12K is also discussed in greater detail below.

Still referring to main body 12, main body 12 also includes a side vent 12L that extends outwardly from the first side 12C. As best seen in FIG. 4, the side vent 12L includes a pair of support walls 12L1 that extends outwardly from the first side 12C while supporting a top plate 12L2 extending downwardly at an angle from the first side 12C towards the bottom end 1F of conveyor 1. One wall of the pair of support walls 12L1 may also define a slit or opening 12L3 so a regulator of the conveyor 1 may restrict a desired amount of airflow from escaping through the side opening 12J (see FIG. 4); such regulator of the conveyor 1 is discussed in greater detail below. It should be understood that the side vent 12L is also free from interfering with the side opening 12J such that the side vent 12L is spaced away from the side opening 12J and allow fluid communication with the interior space of main body 12 and the exterior environment surrounding the main body 12.

Still referring to main body 12, main body 12 may also define an outlet or top opening 12M (see FIG. 3) at the top end 12E of main body 12 and is positioned at a medial point between the front end 12A and the rear end 12B but closer to the rear end 12B. The outlet opening 12M defined in main body 12 also provides access into an interior space of the main body 12, which is discussed in greater detail below. Main body 12 also includes a top vent 12N that extends upwardly from the top end 12E (see FIGS. 2-3). As best seen in FIG. 3, top vent 12N is a top opening 12M that provides access into the interior space of the main body 12 for airflow operation, which is discussed in greater detail below. In the present disclosure, the top vent 12N is positioned between the front end 12A and the rear end 12B closer to the rear end 12B.

Figure 10:
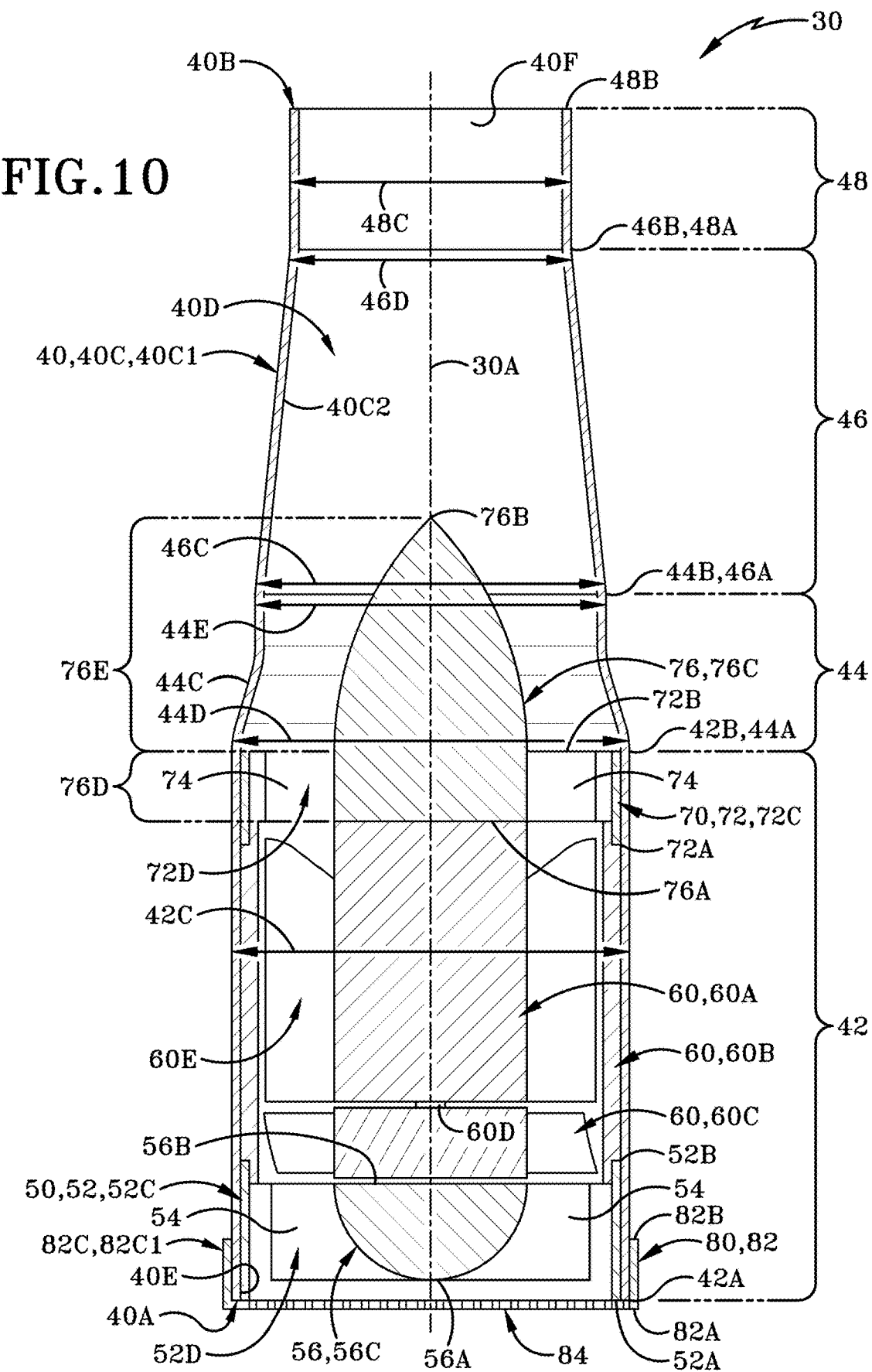
FIG. 10 is a sectional view of the compact air supply unit taken in direction of line 10-10 shown in FIG. 6.

Still referring to main body 12, main body 12 also defines a passageway or interior space 12P (see FIGS. 4 and 10). In the present disclosure, the passageway 12P is accessible at the front end 12A at either the inlet opening 12G or the side opening 12J and is accessible near the rear end 12B at the top opening 12M. Such accessibility of the passageway 12P enables an air supply unit of the conveyor 1 to exert external air into main body 12 at a predetermined rate to move and/or transport a predetermined amount of can blanks from a can blank dispenser to a downstream location or outlet container in a processing line.

Still referring to main body 12, main body 12 also defines a set of grooves 12Q that extends downwardly into the main body 12 from the top end 12E towards the bottom end 12F. In the present disclosure, main body 12 defines two grooves 12Q that extends downwardly into the main body 12 from the top end 12E towards the bottom end 12F. Each groove of the set of grooves 12Q is also separated from one another by a dividing wall 12R of the main body 12.

Still referring to main body 12, main body 12 also includes at least one set of air directors 12S that is positioned at the top end 12E of the main body 12 and is disposed inside at least one groove of the set of grooves 12Q. As best seen in FIG. 3, a first set of air directors 12S1 is positioned at the top end 12E of the main body 12 and is disposed inside of a first groove of the set of grooves 12Q. Still referring to FIG. 3, a second set of air directors 12S2 is positioned at the top end 12E of the main body 12 and is disposed inside of a second groove of the set of grooves 12Q. In the present disclosure, the first and second sets of air directors 12S1, 12S2 face towards the front end 12A of the main body 12 and are transversely opposite to the one another relative to the transverse direction of main body 12. In the present disclosure, the first and second sets of air directors 12S1, 12S2 are also in communication with the passageway 12P to receive exerted air from an air supply unit of the conveyor 1. In operation, and as discussed in greater detail below, the first and second sets of air directors 12S1, 12S2 are configured to direct and convey can blanks dispensed from a can blank dispenser in the longitudinal direction of the main body 12 from the top vent 12N to the front end 12A and away from the conveyor 1.

Still referring to main body 12, main body 12 also defines a recess 12T. In the present disclosure, the recess 12T extends downwardly into the main body 12 from the top end 12E towards the bottom end 12F for receiving a can blank sensor for tray 10, which is discussed in greater detail below. In the present disclosure, the recess 12T is defined between the top vent 12N and the first and second sets of air directors 12S1, 12S2.

Tray 10 also includes a sensor 14 that operably engages with main body 12. As best seen in FIG. 3, sensor 14 operably engages with the main body 12 inside of the recess 12T. In the present disclosure, the sensor 14 may be configured to detect can blanks being dispensed from a can blank dispenser to initiate and/or terminate exertion of air into the tray by an air supply unit of conveyor 1 for transporting can blanks along main body 12. Sensor 14 may also be powered by an external power source or an internal power source of sensor 14. Tray 10 also includes a receiving plate 16 that is mounted to the top end 12E of main body 12 and houses sensor 14 (see FIG. 3). Receiving plate 16 may interact and/or contact with can blanks as can blanks are dispensed from a can blank dispenser.

Figure 1:
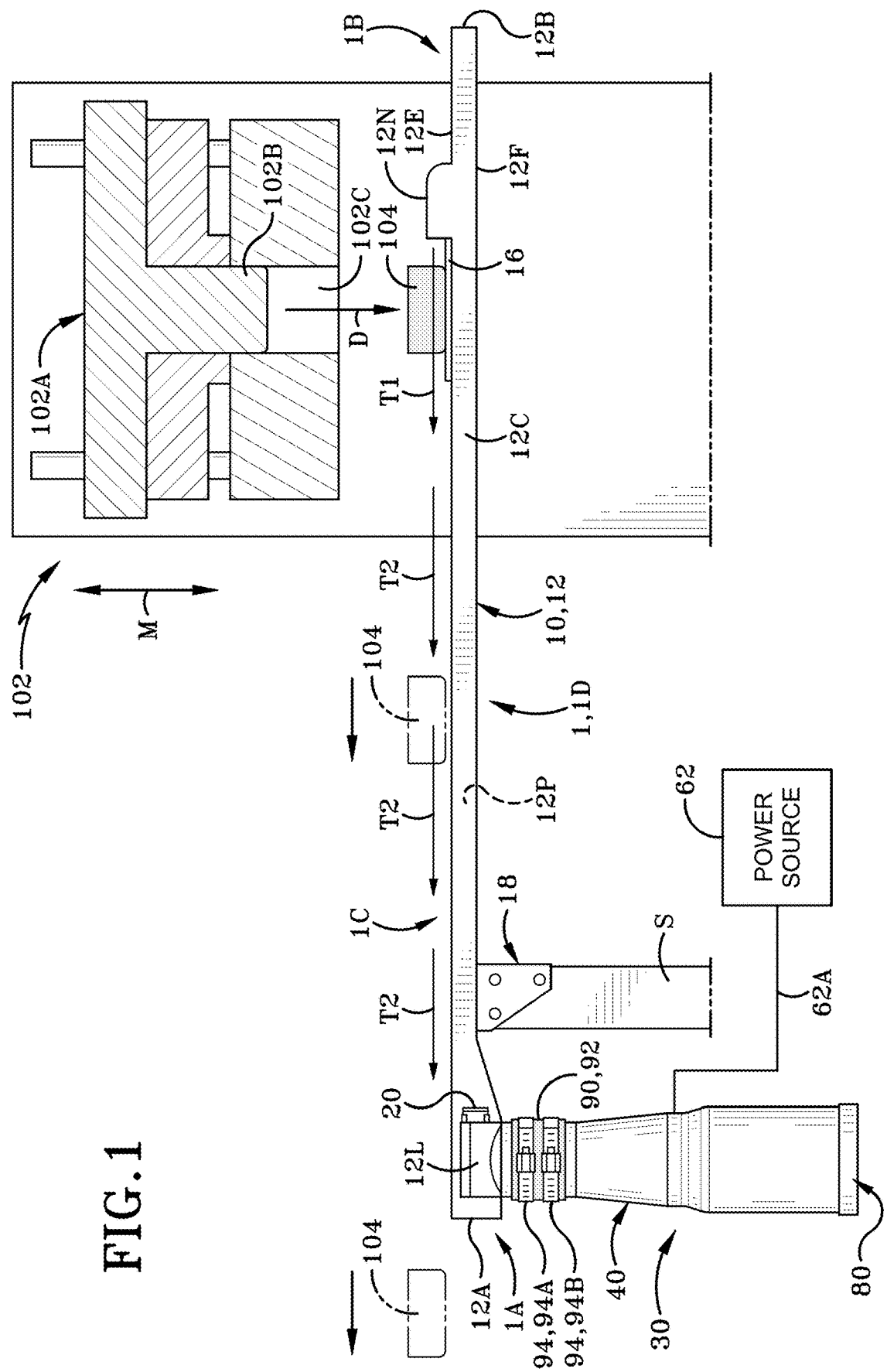
FIG. 1 is a diagrammatic view of can blank dispenser in communication with a can blank conveyor is in accordance with one aspect of the present disclosure.

Tray 10 also includes a mount 18. As best seen in FIGS. 1-2, mount 18 extends downwardly from bottom end 12F of main body 12 and away from the main body 12. In the present disclosure, the mount 18 is positioned between the front end 12A and the rear end 12B but closer to front end 12A. In other exemplary embodiments, mount 18 may located at any position along the length of main body 12. In operation, mount 18 is configured to be secured with a support member separate from the conveyor 1 (see support labeled "S" in FIG. 1).

Tray 10 may also include a regulator 20 that operably engages with main body 12. As best seen in FIG. 4, regulator 20 includes a restrictor plate 20A that operably engages with the pair of tracks 12K at the first side 12C of main body 12. Regulator 20 also includes a pin 20B that extends outwardly from the restrictor plate 20A and into the side opening 12J. Regulator 20 also includes a lever or handle 20C that extends orthogonally from restrictor plate 20A and is free from engaging with the main body 12.

In operation, an operator of conveyor 1 may vary the air entering into the main body 12 from an air supply unit of the conveyor 1 by using regulator 20. As best seen in FIG. 4, restrictor plate 20A is configured to ride inside of the pair of tracks 12K when the operator pulls or pushes the lever 20C in a longitudinal direction (denoted by double arrows labeled "P" in FIG. 4). In one instance, operator may place the restrictor plate 20A completely over the side opening 12J to prevent escapement of air being exerted into the main body 12 by an air supply unit of the conveyor 1. In another instance, operator may slide the restrictor plate 20A completely away from the side opening 12J such that the side opening 12J allows for complete escapement of air being exerted into the main body 12 by an air supply unit of the conveyor 1. In this instance, pin 20B would restrict the movement of restrictor plate 20A due to pin 20B contacting the main body 12 inside of side opening 12J. In yet another instance, and as best seen in FIG. 4, operator may slide the restrictor plate 20A substantially away from the side opening 12J while still covering a portion of the side opening 12J such that the side opening 12J allows for some escapement of air being exerted into the main body 12 by an air supply unit of the conveyor 1.

Conveyor 1 also includes a compact and/or portable air supply unit 30 that operably engages with tray 10. Particularly, air supply unit 30 releasably engages with the main body 12 of tray 10 at the inlet tube 12H such that the air supply unit 30 may be rapidly engageable and disengagable with the inlet tube 12H as compared to conventional air conveyors currently used in the industry. In the present disclosure, the air supply unit 30 is configured to exert air into the main body 12 of the tray 10 for transporting can blanks along the tray 10. Such components and parts of air supply unit 30 are now discussed in greater detail below.

Figure 7:
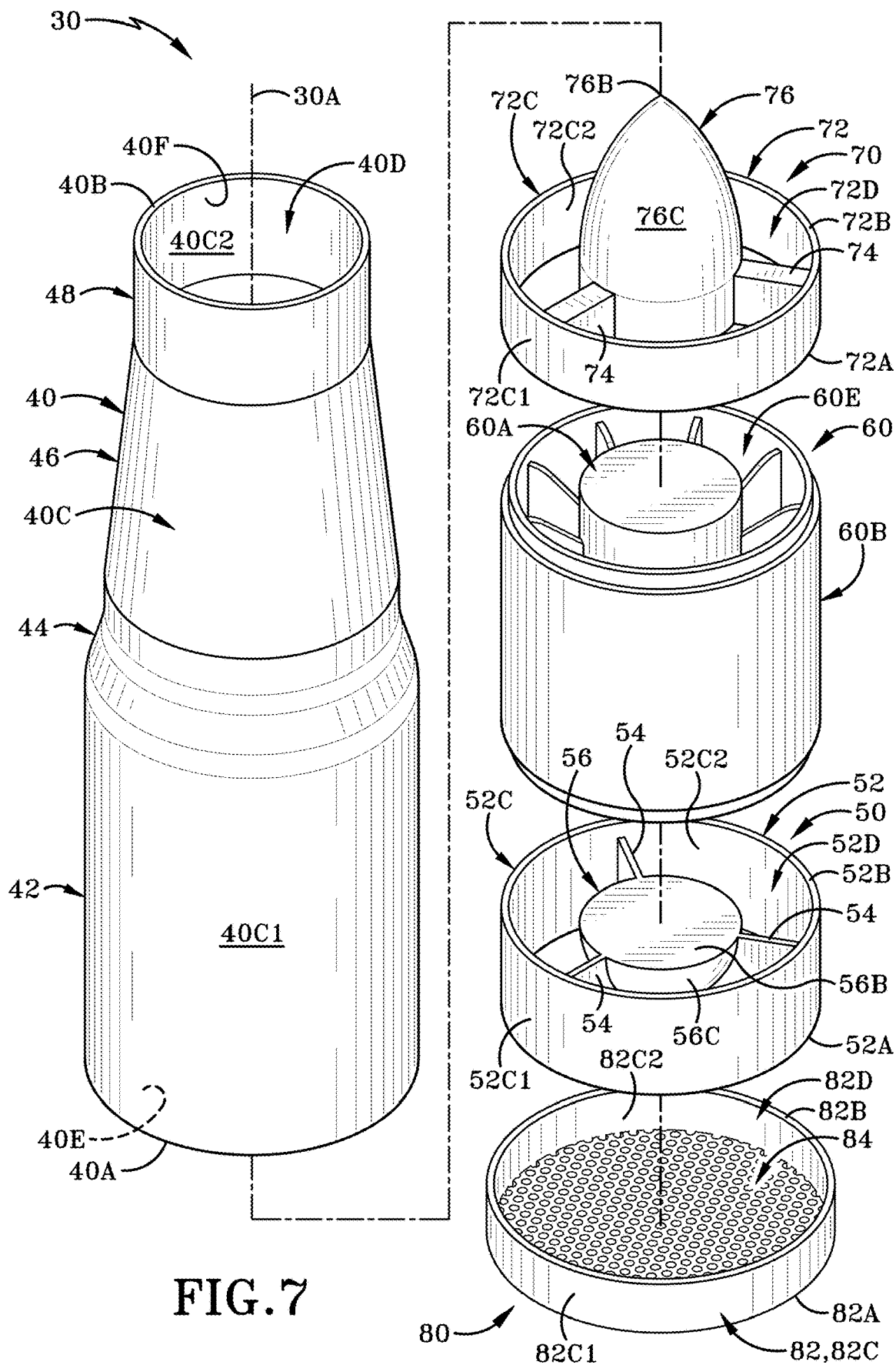
FIG. 7 is an exploded view of the compact air supply unit.
Figure 8:
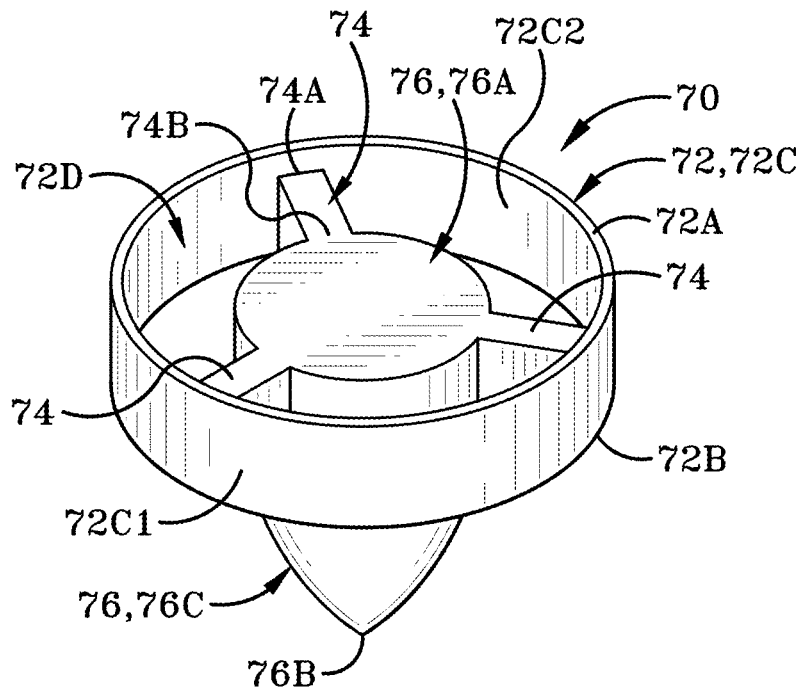
FIG. 8 is a front, bottom isometric perspective view of an outlet cone of the compact supply unit.

Air supply unit 30 includes a housing 40 that operably engages with the main body 12. As best seen in FIGS. 7-8 and 10, housing 40 includes an inlet end 40A, an outlet end 40B opposite to the inlet end 40A, and a longitudinal axis defined therebetween. Housing 40 also includes a wall 40C that extends between the inlet end 40A and the outlet end 40B along the longitudinal axis of housing 40. The wall 40C has an exterior surface 40C1 that extends between the inlet end 40A and the outlet end 40B. The wall 40C also includes an interior surface 40C2 that extends between the inlet end 40A and the outlet end 40B and faces away from exterior surface 40C1. Housing 40 also defines a passageway 40D that extends along the interior surface 40C2 between the inlet end 40A and the outlet end 40B. Passageway 40D is also accessible at an inlet opening 40E defined at the inlet end 40A of housing 40 and at an outlet opening 40F defined at the outlet end 40B.

Still referring to housing 40, housing 40 may include one or more sections that are positioned between the inlet end 40A and the outlet end 40B. As best seen in FIG. 7, housing 40 includes a first section 42 that extends upwardly from the inlet end 42A towards the outlet end 42B. First section 42 includes an inlet end 42A that is positioned at the inlet end 40A, an outlet end 42B opposite to the inlet end 42A and spaced apart from the inlet end 40A, and a diameter 42C that is continuous from the inlet end 42A to the outlet end 42B (see FIG. 10).

Housing 40 also includes a second section 44 that operably engages with and is positioned ahead of the first section 42. As best seen in FIG. 7, second section 44 extends upwardly from the first section 42 towards the outlet end 42B. Second section 44 includes an inlet end 44A that is positioned at the outlet end 42B of first section 42, an outlet end 44B opposite to the inlet end 44A and spaced apart from the first section 42, and a bend 44C defined between the inlet end 44A and the outlet end 44B (see FIG. 10). With such bend 44C, the inlet end 44A defines a first diameter 44D that is greater than a second diameter 44E defined at the outlet end 44B (see FIG. 10). As such, the bend 44C narrows the overall diameter of second section 44 between the inlet end 44A and the outlet end 44B.

Housing 40 also includes a third section 46 that operably engages with and is positioned ahead of the second section 44. As best seen in FIG. 7, third section 46 extends upwardly from the second section 44 towards the outlet end 42B. Third section 46 includes an inlet end 46A that is positioned at the outlet end 44B of second section 44. Third section 46 also includes an outlet end 46B that is opposite to the inlet end 46A and is spaced apart from the second section 44. In the present disclosure, the inlet end 46A defines a first diameter 46C that is greater than a second diameter 46D defined at the outlet end 46B due to the third section 46 defining a tapered and/or conical shape (see FIG. 10).

Housing 40 also includes a fourth section 48 that operably engages with and is positioned ahead of the third section 46. As best seen in FIG. 7, fourth section 48 extends upwardly from the third section 46 to the outlet end 42B. Fourth section 48 includes an inlet end 48A that is positioned at the outlet end 46B of third section 46, an outlet end 48B opposite to the inlet end 48A and is defined at the outlet end 42B, and a diameter 48C that is continuous from the inlet end 48A to the outlet end 48B (see FIG. 10).

With such structural configuration of the housing 40, the diameter 42C of the first section 42 is equal with the first diameter 44D of the second section 44 and is greater than the second diameter 44E of the second section 44, the first and second diameters 46C, 46D of the third section 46, and the diameter 48C of the fourth section 48. Additionally, the second diameter 44E of the second section 44 is equal with the first diameter 46C of the third section 46 and is greater than the second diameter 46D of the third section 46 and the diameter 48C of the fourth section 48. Further, the second diameter 46D of the third section 46 is equal with the diameter 48C of the fourth section 48. Such difference in diameters along the length of the housing 40 may enhance the air flow through the housing 40 based on the drawing force and exertion force applied by a fan unit of the air supply unit 30, which is discussed in greater detail below.

Figure 9:
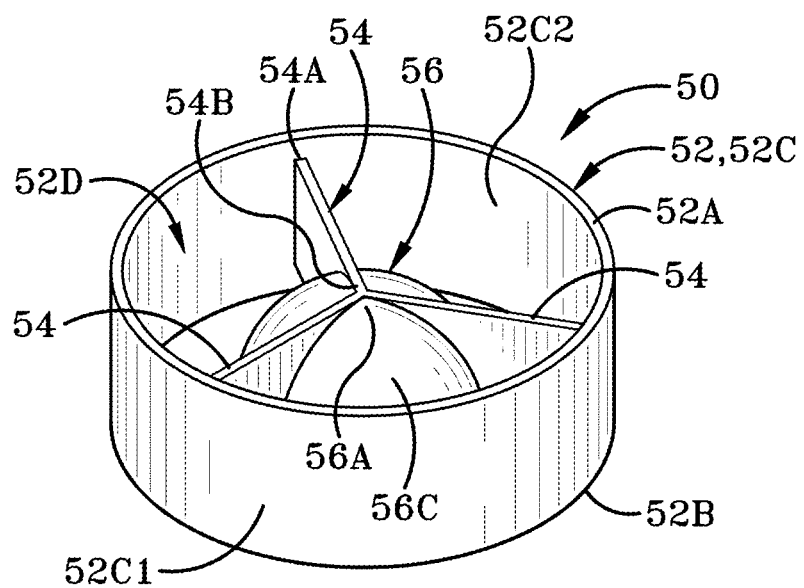
FIG. 9 is a front, top isometric perspective view of an inlet cone of the compact supply unit.

Air supply unit 30 also includes an inlet cone 50 that operably engages with the wall 40C of housing 40, particularly with the interior surface 40C2. As best seen in FIGS. 7 and 9, inlet cone 50 includes a frame 52 that has an inlet end 52A, an outlet end 52B opposite to the inlet end 52A, and a wall 52C that extends between the inlet end 52A and the outlet end 52B. In the present disclosure, the wall 52C of frame 52 includes an exterior surface 52C1 that operably engages with interior surface 40C2 of wall 40C. The wall 52C of frame 52 also includes an interior surface 52C2 that extends between the inlet end 52A and the outlet end 52B and faces away from the exterior surface 52C1. Still referring to FIGS. 7 and 9, frame 52 also defines a passageway 52D that extends along the interior surface 52C2 between the inlet end 52A and the outlet end 52B. In the present disclosure, frame 52 defines an annular profile that matches with an annular inner profile of the housing 40. In other exemplary embodiments, frame 52 of inlet cone 50 may define any suitable profile that matches with the inner profile of the housing 40.

Still referring to inlet cone 50, inlet cone 50 includes at least one support arm 54 that extends inwardly from the frame 52 and into the passageway 52D of frame 52. As best seen in FIG. 9, inlet cone 50 includes three support arms 54 that extend inwardly from the interior surface 52C2 of the frame 52 and into the passageway 52D. Each support arm 54 includes a first end 54A that operably engages with the interior surface 52C2 of the wall 52C of frame 52 and a second end 54B that is opposite to the first end 54A and is spaced apart from the interior surface 52C2. In the present disclosure, the second ends 54B of the support arms 54 operably engage with one another inside of the passageway 52D and away from the interior surface 52C2.

Still referring to inlet cone 50, inlet cone 50 also include a deflector or director 56 that operably engages with the support arms 54. As best seen in FIGS. 7 and 9, deflector 56 includes an inlet end 56A that is offset from inlet end 52A of the frame 52, an outlet end 56B that is opposite to the inlet end 56A and even with the outlet end 52B of the frame 52, and a deflecting wall 56C extends between the inlet end 56A and the outlet end 56B. The entire deflector 56 is also disposed entirely inside of the passageway 52D due to the inlet end 56A of the deflector 56 being offset with and/or ahead of the inlet end 52A of the frame 52 and the outlet end 56B of the deflector 56 being even with the outlet end 52B of the frame 52. In the present disclosure, the deflecting wall 56C also defines a parabolic shape and/or outer profile when extending from the inlet end 56A to the outlet end 56B for directing external air into a fan unit of the air supply unit 30 as such external air is being drawn into the housing 40 by the fan unit.

In the present disclosure, the three support arms 54 of the inlet cone 50 also splits the deflector 56 into three sections such that the inlet cone 50 include three deflecting walls 56C (see FIG. 9). In one exemplary embodiment, the deflector 56 may be one, solid member wherein the three support arms 54 are engaged at the deflecting wall 56C and remain exterior to the deflector 56.

Air supply unit 30 also include a fan unit 60 that is positioned inside of housing 40. As best seen in FIG. 10, fan unit 60 is positioned vertically above and/or ahead of the inlet cone 50 wherein the external air being drawn in by the fan unit 60 passes over and is directed by the inlet cone 50. In the present disclosure, fan unit 60 includes a fan motor or engine 60A that is protected by a fan housing 60B (see FIG. 10). The fan motor 60A is also operably engaged with a set of blades 60C that is positioned vertically below the fan motor 60A and proximate to the inlet cone 50. During operation, fan motor 60A is configured to spin and/or rotate the set of blades 60C by a drive shaft 60D (see FIG. 11) at a predetermined rate to draw the external air into the housing 40. The external air being drawn in by the set of blades 60C also passes over the deflector 56 of inlet cone 50 to direct the external air into the set of blades 60C at a first flow rate or direction. Fan housing 60B also defines a fan passageway 60E along the entire length of the fan housing 60B for directing air through the fan unit 60 after being exerted by the set of blades 60C.

It should be understood that fan unit 60 may be any commercially-available fan unit or machine that is configured to draw external air into the housing 40 for transporting a predetermined amount of can blanks from a can blank dispenser to a downstream location or outlet container. In the present disclosure, the fan unit 60 discussed herein is a low-voltage fan unit for transporting a predetermined amount of can blanks from a can blank dispenser to a downstream location or outlet container. In one exemplary embodiment, a fan unit discussed herein may be powered in a range of voltages between 12 volts to 100 volts. In another exemplary embodiment, a fan unit discussed herein may be powered by 12 volts. In another exemplary embodiment, a fan unit discussed herein may be powered by 24 volts. In another exemplary embodiment, a fan unit discussed herein may be powered by 36 volts.

In the present disclosure, fan unit 60 is also powered by a power source 62 so that the fan unit 60 may draw air into the housing 40 from the external environment of conveyor 1 and exert said air into the tray 10 for transporting can blanks along the main body 12. It should be understood that power source 62 may be any suitable power source that is configured to provide a suitable amount of electrical power to the fan unit 60 for transporting purposes need by conveyor 1. It should also be noted that power source 62 illustrated herein is diagrammatically connected with fan unit 60, via an electrical connection 62A, and may be located at any position relative to air supply unit (e.g., housed inside of housing 40, engaged with exterior surface 40C1 of the wall 40C of housing 40, engaged with the main body 12 of tray 10, and other suitable positions that are proximate to the conveyor 1).

Air supply unit 30 may also include an outlet cone 70 that operably engages with the wall 40C of housing 40, particularly with the interior surface 40C2, and is positioned ahead of the inlet cone 50 and fan unit 60. As best seen in FIGS. 7 and 8, outlet cone 70 includes a frame 72 that has an inlet end 72A, an outlet end 72B opposite to the inlet end 72A, and a wall 72C that extends between the inlet end 72A and the outlet end 72B. The wall 72C includes an exterior surface 72C1 that extends between the inlet end 72A and the outlet end 72B and operably engages with interior surface 40C2 of the wall 40C of housing 40. The wall 72C also includes an interior surface 72C2 extending between the inlet end 72A and the outlet end 72B and faces away from the exterior surface 72C1. Still referring to FIGS. 7 and 8, frame 72 also defines a passageway 72D that extends along the interior surface 72C2 between the inlet end 72A and the outlet end 72B. In the present disclosure, frame 72 defines an annular profile that matches with an annular inner profile of the housing 40. In other exemplary embodiments, frame 72 of outlet cone 70 may define any suitable profile that matches with the inner profile of the housing 40.

Still referring to outlet cone 70, outlet cone 70 includes at least one support arm 74 that extends inwardly from the frame 72 and into the passageway 72D of frame 72. As best seen in FIG. 8, outlet cone 70 includes three support arms 74 that extend inwardly from the interior surface 72C2 of the frame 72 and into the passageway 72D. Each support arm 74 includes a first end 74A that operably engages with the interior surface 72C2 of the wall 72C of frame 72 and a second end 74B that is opposite to the first end 74A and is spaced apart from the interior surface 72C2. In the present disclosure, the second ends 74B of the support arms 74 operably engage with a deflector of the outlet cone 70 inside of the passageway 72D and away from the interior surface 72C2, which is discussed in greater detail below.

Still referring to outlet cone 70, outlet cone 70 also include a deflector or director 76 that operably engages with the support arms 74. As best seen in FIGS. 7 and 8, deflector 76 includes an inlet end 76A that is spaced ahead of the inlet end 72A of the frame 72 such that the inlet end 76A is offset with the inlet end 72A of frame 72, an outlet end 76B that is opposite to the inlet end 76A and spaced apart from and ahead of the outlet end 72B of the frame 72, and a deflecting wall 76C extending between the inlet end 76A and the outlet end 76B. As best seen in FIG. 10, deflecting wall 76C may be divided into a first or base portion 76D that extends between the inlet end 76A towards the outlet end 76B and a second or nose portion 76E that extends between the base portion 76D to the outlet end 76B. In the present disclosure, the deflecting wall 76C defines a parabolic shape when extending from the inlet end 76A to the outlet end 76B for directing forced air from the fan unit 60 into the inlet tube 12H of main body 12.

In the present disclosure, the three support arms 74 of the outlet cone 70 engages with the deflecting wall 76C of deflector 76. Particularly, and as best seen in FIG. 8, the second ends 74B of the three support arms 74 engage with the deflecting wall 76C of deflector 76. In other exemplary embodiments, outlet cone 70 may include any suitable number of support arms 74 for operably engaging the deflector 76 with the frame 72.

Air supply unit 30 also includes a guard 80. In the present disclosure, guard 80 operably engages with the housing 40 at the inlet end 40A to protect and/or shield any debris or material from entering into the housing 40 through inlet opening 40E. As best seen in FIG. 7, guard 80 includes a frame 82 that has an inlet end 82A, an outlet end 82B that is opposite to the inlet end 82A, and a longitudinal axis defined therebetween. Frame 82 also includes a wall 82C that extends between the inlet end 82A and the outlet end 82B. The wall 82C also includes an exterior surface 82C1 that extends between the inlet end 82A and the outlet end 82B and faces away from the housing 40 when the guard 80 engages with the housing 40. The wall 82C also includes an interior surface 82C2 that extends between the inlet end 82A and the outlet end 82B and faces at the housing 40 when guard 80 engages with the housing 40. In the present disclosure, the interior surface 82C2 of the wall 82C of frame 82 operably engages with the exterior surface 40C1 of the wall 40C of the housing 40 at the inlet end 40A.

Still referring to frame 82, frame 82 also defines a passageway 82D that extends between the inlet end 82A and the outlet end 82B. As best seen in FIG. 10, the passageway 82D is accessible at the inlet end 82A and at the outlet end 82B due to inlet end 82A and outlet end 82B defining openings therein. Such passageway 82D enables fan unit 60 to draw external air from the external environment of air supply unit 30 and into the housing 40 for transporting a predetermined amount of can blanks from a can blank dispenser to a downstream location or outlet container.

Guard 80 also includes a protective screen 84 that operably engages frame 82. As best seen in FIG. 7, protective screen 84 operably engages with interior surface 82C2 of the wall 82C of frame 82 inside of the passageway 82D at the inlet end 82A. In operation, protective screen 84 protects the fan unit 60 from drawing in unwanted debris and/or material into the housing 40 when drawing in external air from the external environment. It should be understood that protective screen 84 may be engaged along any portion of the interior surface 82C2 of the wall 82C while being free from interfering with the fan unit 60.

With such discussion of each component of the air supply unit 30, the structural arrangement of the components of the air supply unit 30 is now discussed. Working upwardly from the inlet end 40A of housing 40, the inlet cone 50 is positioned entirely inside of the first section 42 of housing 40 such that the frame 52 of inlet cone 50 is flush with or positioned interior of the inlet end 40A of housing 40 (see FIG. 10). The inlet cone 50 is also positioned inside of the first section 42 of housing 40 proximate to the inlet end 42A of first section 42. The exterior surface 52C1 of the wall 52C of frame 52 of inlet cone 50 also operably engages with the interior surface 40C2 of the wall 40C of housing 40 to secure the inlet cone 50 inside of the passageway 40D.

At the inlet end 40A of housing 40, the guard 80 is operably engaged with the housing 40 at the inlet end 40A. As best seen in FIG. 10, the interior surface 82C2 of the wall 82C of frame 82 operably engages with the exterior surface 40C1 of the wall 40C of housing 40 wherein the guard 80 covers the inlet opening 40E via the protective screen 84. It should be understood that guard 80 may be operably engaged with housing 40 via any suitable attachment means or components (either permanent means or temporary means) to maintain the guard 80 with the housing 40. In the present disclosure, the guard 80 is permanently engaged with the housing 40 via weld attachments.

Working upwardly from the inlet cone 50, the fan unit 60 is positioned entirely inside of the housing 40 and positioned vertically above the inlet cone 50. As best seen in FIG. 10, the set of blades 60C of fan unit 60 is positioned directly above the deflector 56 of inlet cone 50. In the present disclosure, the outlet end 52B of frame 52 also operably engages with fan housing 60B such that the fan housing 60B rests on the outlet end 52B of the frame 52. The fan unit 60 is also positioned inside of the first section 42 of housing 40 between the inlet end 42A of first section 42 and the outlet end 42B of first section 42. The fan housing 60B also operably engages with the interior surface 40C2 of the wall 40C of housing 40 to secure the fan housing 60B inside of the passageway 42E.

Working upwardly from the fan unit 60, the outlet cone 70 is positioned entirely inside of the housing 40 and positioned vertically above the fan unit 60. As best seen in FIG. 10, the deflector 76 of outlet cone 70 is positioned directly above the fan housing 70B and the deflector 56 of inlet cone 50 such that the inlet cone 50, the fan unit 60, and the outlet cone 70 are coaxially aligned with one another via a central axis (a dashed lined denote "30A" in FIG. 10). In the present disclosure, the inlet end 72A of frame 72 also operably engages with fan housing 60B such that the outlet end 72B of the frame 72 rests on the fan housing 60B. The outlet cone 70 is also positioned inside of the first section 42 of the housing 40, the second section 44 of housing 40, and the third section 46 of housing 40. In particular, the frame 72, the support arms 74, and the base portion 76D of the deflector 76 are disposed inside of the first section 42, and the nose portion 76E of deflector 76 is disposed inside of the second section 44 and the third section 46. The exterior surface 72C1 of the wall 72C of frame 72 of outlet cone 70 also operably engages with the interior surface 40C2 of the wall 40C of housing 40 to secure the outlet cone 70 inside of the passageway 52D.

Conveyor 1 also includes a connector 90 that operably engages the air supply unit 30 with the tray 10. As best seen in FIGS. 4 and 10, sleeve 92 includes a first end 92A, a second end 92B opposite to the first end 92A, and a longitudinal axis defined therebetween. The sleeve 92 also includes a wall 92C that extends between the first end 92A and the second end 92B. The wall 92C also includes an exterior surface 92C1 that extends between the first end 92A and the second end 92B and faces towards the external environment of sleeve 92. The wall 92C also includes an interior surface 92C2 that extends between the first end 92A and the second end 92B and faces inwardly in an opposite direction relative to the exterior surface 92C1. The sleeve 92 also defines a passageway 92D along the interior surface 92C2 between the first end 92A and the second end 92B. The passageway 92D is accessible at the first end 92A and the second end 92B wherein the first end 92A and the second end 92B define openings therein.

In operation, the sleeve 92 is configured to fit over a portion of the inlet tube 12H of main body 12 spaced apart from the bottom end 12F of main body 12 and a portion of the housing 40 at the outlet end 40B of the air supply unit 30. As best seen in FIG. 4, the first end 92A of sleeve 92 is configured to contact a portion of the housing 40 near the outlet end 40B of housing 40, and the second end 92B of sleeve 92 is configured to contact a portion of the inlet tube 12H. Still referring to FIG. 4, a first portion of the interior surface 92C2 of the wall 92C of sleeve 92 that is measured from the first end 92A to a medial point between the first end 92A and the second end 92B engages with the exterior surface 40C1 of the wall 40C of housing 40 wherein the outlet end 40B of housing 40 is disposed inside of passageway 92D. Still referring to FIG. 4, a second portion of the interior surface 92C2 of the wall 92C of sleeve 92 that is measured from the second end 92B to a medial point between the first end 92A and the second end 92B engages with the exterior wall of inlet tube 12H wherein a portion of inlet tube 12H of housing 40 is disposed inside of passageway 92D. Upon assembly, the inlet tube 12H and the housing 40 are in fluid communication with one another inside of passageway 92D such that air exerted by the fan unit 60 may be transported from the housing 40 to the main body 12 of tray 10 for conveying can blanks along the tray 10.

Connector 90 also includes at least one fastener 94 that secures the sleeve 92 with the inlet tube 12H of main body 12 and the housing 40 of air supply unit 30. As best seen in FIGS. 4 and 10, connector 90 includes a pair of fasteners 94 that surrounds the inlet tube 12H, the housing 40, and the sleeve 92 to releasably engage the inlet tube 12H, the housing 40, and the sleeve 92 with one another. In one instance, a first fastener 94A of the pair of fasteners 94 releasably engages the inlet tube 12H and the sleeve 92 with one another to suspend the sleeve 92 from the inlet tube 12H. In another instance, a second fastener 94B of the pair of fasteners 94 releasably engages the housing 40 and the sleeve 92 with one another to suspend the housing 40 (and all components housed inside of and engaged with housing 40 of the air supply unit 30) from the inlet tube 12H by the sleeve 92.

Such structural configuration between the tray 10 and the air supply unit 30 is considered advantageous at least because operators of the conveyor 1 may rapidly remove and replace the entire air supply unit 30 from the tray 10 with another air supply unit 30 for maintenance and repair purposes. As such, the structural configuration between the tray 10 and the air supply unit 30 enables operators of the conveyor 1 to rapidly remove and replace the entire air supply unit 30 from the tray 10 with another air supply unit 30 without shutting down surrounding conveyors and/or operation of the process. As compared to conventional air supply units for these types of can blank conveyors, operators of these can blank conveyors 1 are free from maintaining and/or repairing various lengths of hoses and/or tubes that supply the air to the tray from the fan unit, repairing a single fan unit that may be supplying air to a plurality of trays, and troubleshooting issues that may be labor intensive due to the complexity and/or number of devices providing air to each tray. In the illustrated embodiment, operators may simply perform maintenance and repair on the air supply unit 30 of an individual conveyor 1 without needing to perform conventional checks and procedures as required by the conventional can blank conveyors that have components and/or parts located at various distances away from the conveyor.

While the present disclosure utilizes connector 90 to operably engage the tray 10 and the air supply unit 30 with one another, other suitable arrangements may be used to operably engage the tray 10 and the air supply unit 30 with one another. In one example, inlet tube 12H of main body 12 of tray 10 and the housing 40 of air supply unit 30 may define matching and/or corresponding threaded connections for threadably engaging the housing 40 with the inlet tube 12H for suspending the air supply unit 30 from tray 10. In another example, latching mechanisms and/or quick release mechanisms may be provided with the inlet tube 12H of main body 12 of tray 10 and the housing 40 of air supply unit 30 to rapidly engage and disengaging one or more air supply units 30 from tray 10 for maintenance or repair purposes.

Having now discussed the component and parts of the conveyor 1, methods of using the conveyor 1 to transport can blanks and replacing air supply units 30 are discussed in greater detail below.

Prior to receiving can blanks from a can blank dispenser, the fan unit 60 of air supply unit 30 may be initiated, either manually or automatically. In one instance, the fan unit 60 of air supply unit 30 may be manually initiated from an OFF state to an ON state by an operator of the conveyor 1. In another instance, the fan unit 60 of air supply unit 30 may be automatically initiated from an OFF state to an ON state by sensor 14 sensing and/or detecting a can blank provided on top plate 16. Once initiated, the fan motor 60A applies a rotational force on the set of blades 60C to begin drawing air into the housing 40 that surrounds the exterior environment of the conveyor 1 for transporting purposes; such rotational force applied to the set of blades 60C is denoted by arrows labeled "R" in FIG. 11. It should be noted that fan motor 60A may continue to apply rotational force on the set of blades 60C until the fan motor 60A is manually or automatically stopped.

Once the set of blades 60C begins to rotate, the air that surrounds the exterior environment of the conveyor 1 may be drawn into the housing 40 via the fan unit 60 creating a desired airstream. Initially, the airstream being drawn into the housing 40 by the fan unit 60 passes through the guard 80, particularly the protective screen 84; such airstream being initially drawn into the housing 40 by fan unit 60 is denoted by arrows labeled "A" in FIG. 11. As discussed above, the protective screen 84 enables air to pass into the housing 40 and the inlet opening 40E yet prevent unwanted debris or material from entering into the housing 40 and interfering with the operation of fan unit 60.

Figure 11:
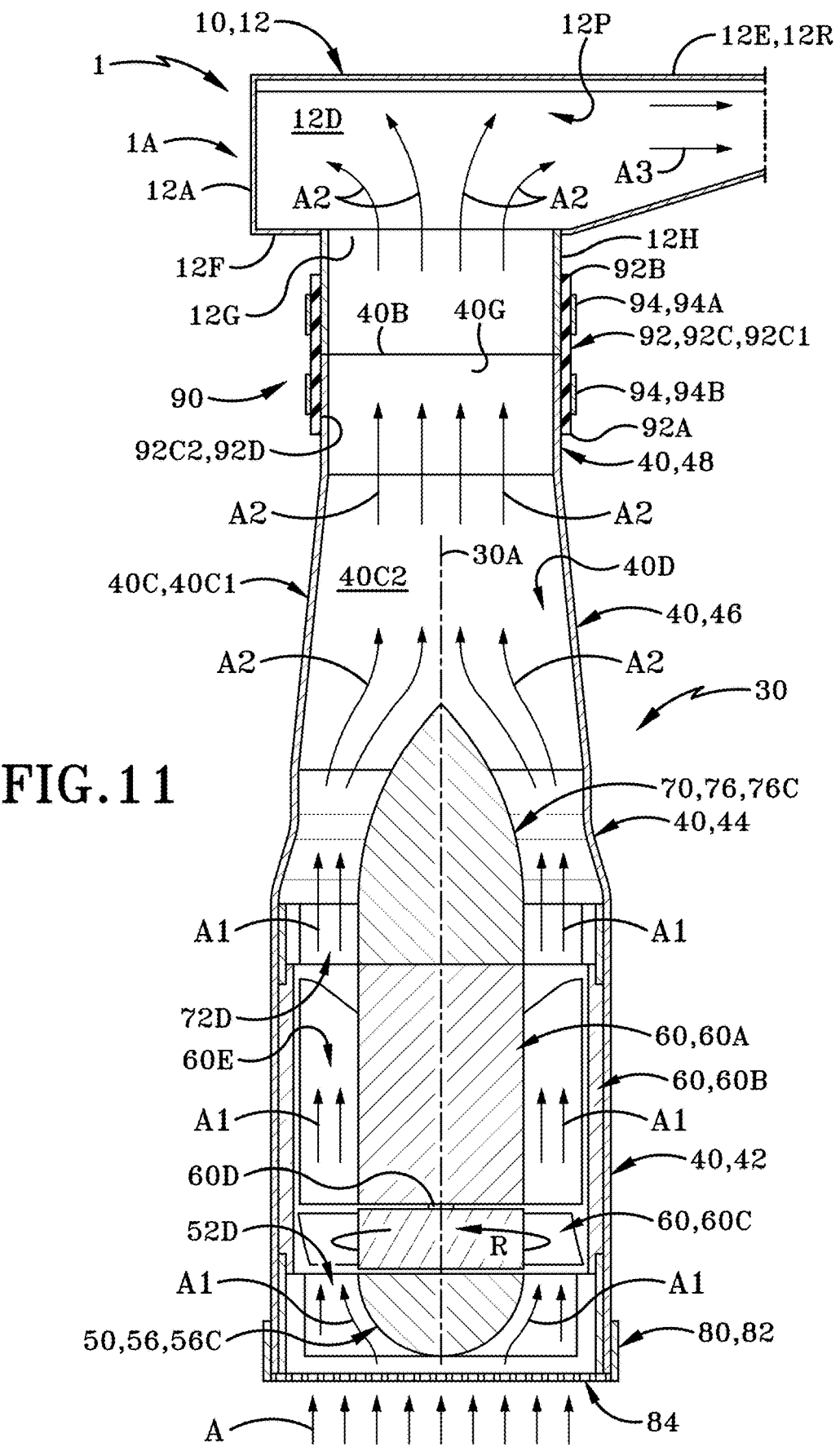
FIG. 11 is an operational view of the compact air supply unit drawing external air into a housing of the compact air supply unit and exerting said external air into the tray at a predetermined rate.

As the airstream passes through the guard 80, the airstream then interferes with and/or is directed by inlet cone 50. As best seen in FIG. 11, deflector 56 of the inlet cone 50 may apply a first direction of flow on the airstream wherein the airstream is deflected outwardly and rides along the deflecting wall 56C from the inlet end 56A to the outlet end 56D of deflector 56; such application of a first direction of flow on the airstream is denoted by arrows labeled "A1" in FIG. 11. Once the airstream is directed by inlet cone 50, the airstream is then exerted upwardly through the fan housing 60B and towards the outlet cone 70.

As the airstream passes through the fan housing 60B, the airstream then interferes with and/or is directed by outlet cone 70. As best seen in FIG. 11, deflector 76 of the outlet cone 70 may apply a second direction of flow on the airstream wherein the airstream is deflected inwardly and rides along the deflecting wall 76C from the inlet end 76A to the outlet end 76B of deflector 76; such application of a second direction of flow on the airstream is denoted by arrows labeled "A2" in FIG. 11. The airstream may also be affected by the second section 44 of housing 40 by directing the airstream inwardly towards the deflector 76 due to the bend 44C defined in the second section 44.

Once the airstream is directed by outlet cone 70, the airstream then continues to move upwardly through the housing 40 towards the outlet opening 40F. Prior to be exerted through the outlet opening 40F, the airstream may also be affected by the third section 46 of housing 40 by directing the airstream inwardly towards the fourth section 48 due to tapered configuration of the third section 46.

Once the airstream passes through the outlet opening 40F of housing 40, the airstream then passes into the inlet tube 12H due to the connector 90 operably engaging the tray 10 and the air supply unit 30 with one another. The airstream continues to be exerted upwardly through the inlet tube 12H and into the inlet opening 12G of main body 12 so that the airstream is forced into the passageway 12P of the main body 12 for moving can blanks along the top end 12E of the main body 12. As the airstream passes into the passageway 12P, the main body 12 directs the airstream to the top opening 12M to be directed by the top vent 12N and the first and second sets of air directors 12S1, 12S2.

As the airstream passes through the top vent 12N and the first and second sets of air directors 12S1, 12S2, a can blank dispenser 102 may dispense a predetermined amount of can blanks 104 onto the conveyor 1, particularly the main body 12 and top plate 16, that must be transported to an output container or a downstream machine for further refinement of the can blanks 104. As best seen in FIG. 1, each can blank 104 may be dispensed onto the top plate 16 and placed in front of the top vent 12N by a press 102A of the can blank dispenser 102 (movement of press 102A is denoted by double arrows labeled "M" in FIG. 1). The press 102A may include a ram or pusher 102B that dispenses the can blanks 104 downwardly through a chute 102C that is positioned directly over the sensor 14 and top plate 16 of conveyor 1. It should be understood that can blank dispenser 102 is exemplary only and any suitable can blank dispenser 102 may be used in conjunction with one or more conveyors 1.

As the can blanks 104 reach the conveyor 1, the airstream traveling through the top opening 12M and into the top vent 12N is directed at and exerted against the can blanks 104 such that the can blanks 104 are transported longitudinally from the top plate 16 to the front end 12A of the main body 12. Such longitudinal exertion of the airstream against the can blank 104 is denoted by an arrow labeled "T1" in FIG. 1. As the can blanks 104 are being transported longitudinally along the main body 12, the first and second sets of air directors 12S1, 12S2 also apply a similar force to the can blanks 104 to transport said can blanks 104 longitudinally from the top plate 16 to the front end 12A of the main body 12. Such longitudinal exertion of the airstream against the can blanks 104 is denoted by arrows labeled "T2" in FIG. 1. This process may continue until the sensor 14 no longer detects a can blank 104 resting on top plate 16.

If desired, operator may also adjust the regulator 20 of the tray 10 to regulate the flow rate of the airstream entering into the main body 12. As best seen in FIG. 4, and as discussed above, the operator may pull or push on the lever 20C of regulator 20 until the restrictor plate 20A is blocking a desired amount of the side opening 12J to exhaust excess air from the main body 12. Such position of the restrictor plate 20A relative to the side opening 12J may apply a third direction of flow on the airstream as the airstream is directed into the passageway 12P of main body 12; such application of a third direction of flow on the airstream is denoted by arrows labeled "A3" in FIG. 11. The excess air being exhausted through the side opening 12J would be directed downwardly and away from the main body 12 by the side vent 12L.

If the air supply unit 30 is damaged, in need of a service or repair, and/or no longer operates, the operator of conveyor 1 may simply remove and replace the damaged air supply unit 30 with another air supply unit without utilizing conventional procedures and/or methods of repairing said air supply unit 30. In this case, operator would simply loosen and/or release the second fastener 94B of the pair of fasteners 94 from the sleeve 92 and housing 40 until the housing 40 is free from being secured with the sleeve 92. Once released, the operator simply removes the damaged air supply unit 30 (in its entirety) from the tray 10 and introduces the new air supply unit 30 to the tray 10. In the reverse procedure, operator would simply tighten and/or engage the second fastener 94B of the pair of fasteners 94 with the sleeve 92 and housing 40 of the new air supply unit 30 until the housing 40 of the new air supply unit 30 is secured with the sleeve 92 such that the air supply unit 30 suspended from the inlet tube 12H.

FIGS. 12A-12D illustrate a can blank conveyor system 200 that includes a plurality of can blank conveyors transporting a plurality of can blanks 204. In this embodiment, however, at least one can blank conveyor of the can blank conveyor is malfunctioning and/or in need of service while the remaining the can blank conveyors remain in operation.

It should be understood that can blank conveyors 201A-201D are identical to the can blank conveyor 1 discussed above and illustrated in FIGS. 1-10. As such, a first can blank conveyor 201A includes a first tray 210A and a first air supply unit 230A that are identical to the tray 10 and air supply unit 30 discussed above, a second can blank conveyor 201B includes a second tray 210B and a second air supply unit 230B that are identical to the tray 10 and air supply unit 30 discussed above, a third can blank conveyor 201C includes a third tray 210C and a third air supply unit 230B that are identical to the tray 10 and air supply unit 30 discussed above, and a fourth can blank conveyor 201D includes a fourth tray 210D and a fourth air supply unit 230B that are identical to the tray 10 and air supply unit 30 discussed above. It should also be understood that while four can blank conveyors 201A-201D are demonstrated in can blank conveyor system 200, can blank conveyor system 200 may include any suitable number of can blank conveyors.

Figure 12A:
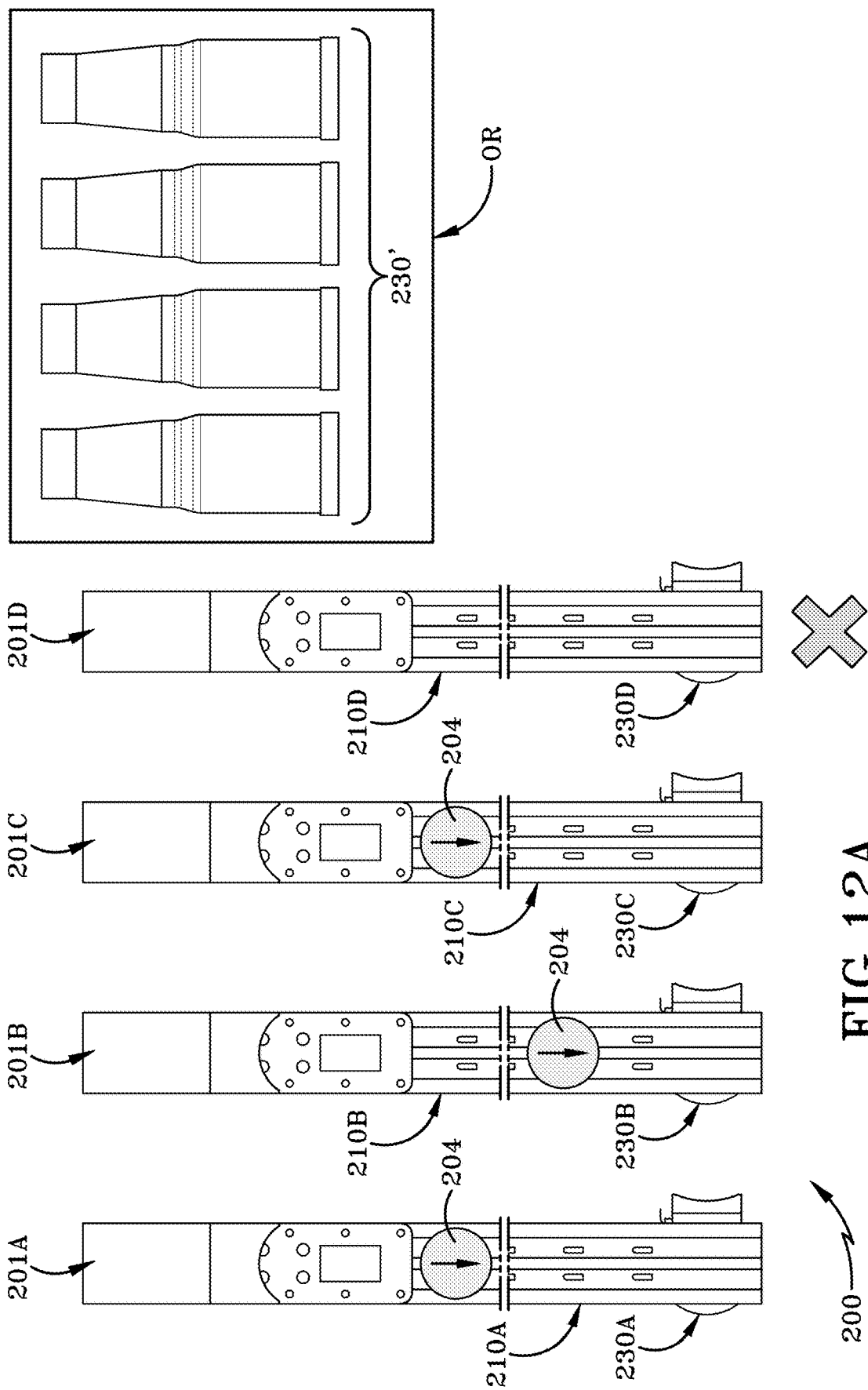
FIG. 12A is an operational view of a can blank conveyor system, wherein an air supply unit of a can blank conveyor of the can blank conveyor system is inoperative while the remaining the can blank conveyors are operative.
Figure 12B:
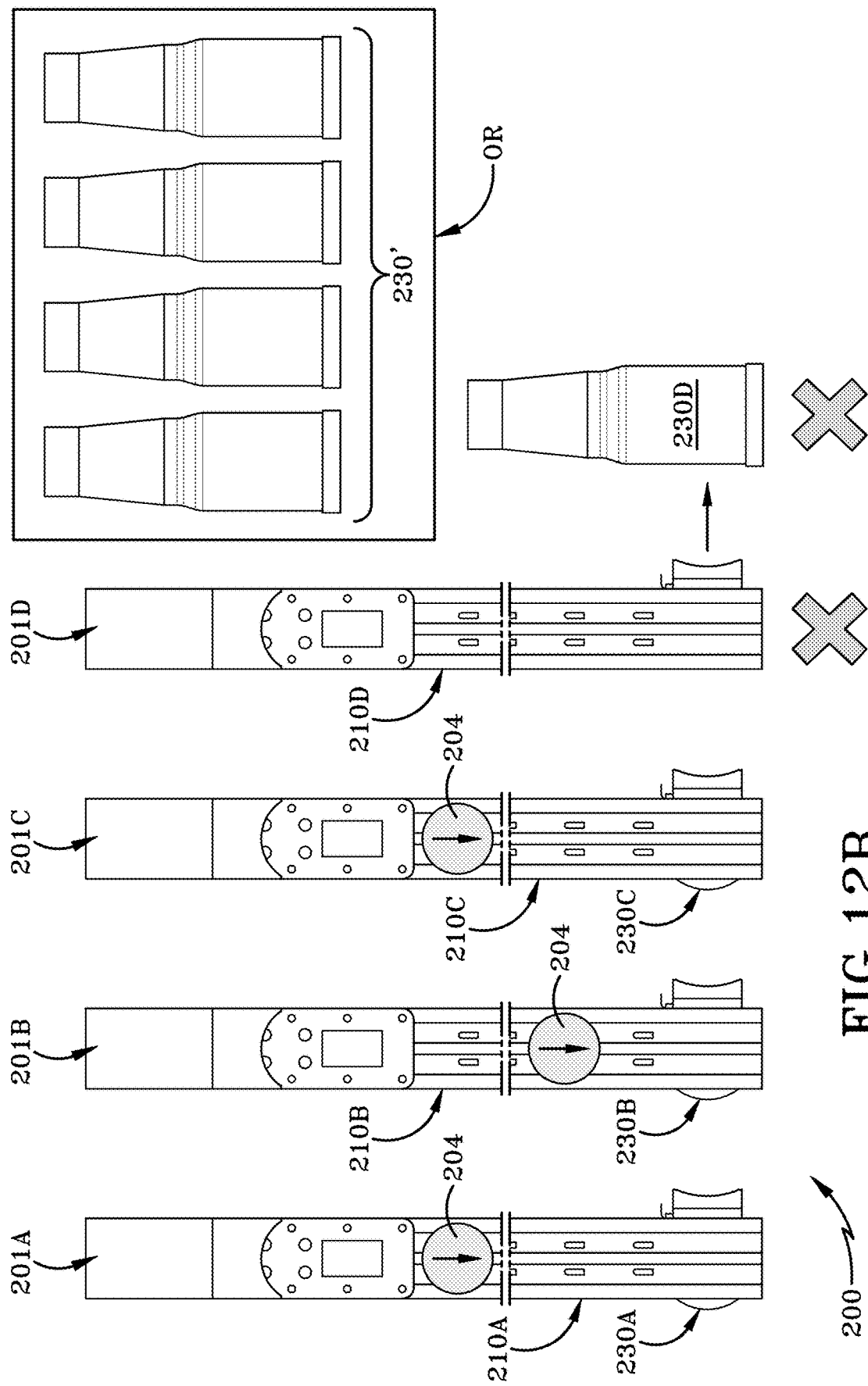
FIG. 12B is another operational view similar to FIG. 12A, but the inoperative air supply unit of the corresponding can blank conveyor is removed from a tray of the corresponding can blank conveyor.
Figure 12C:
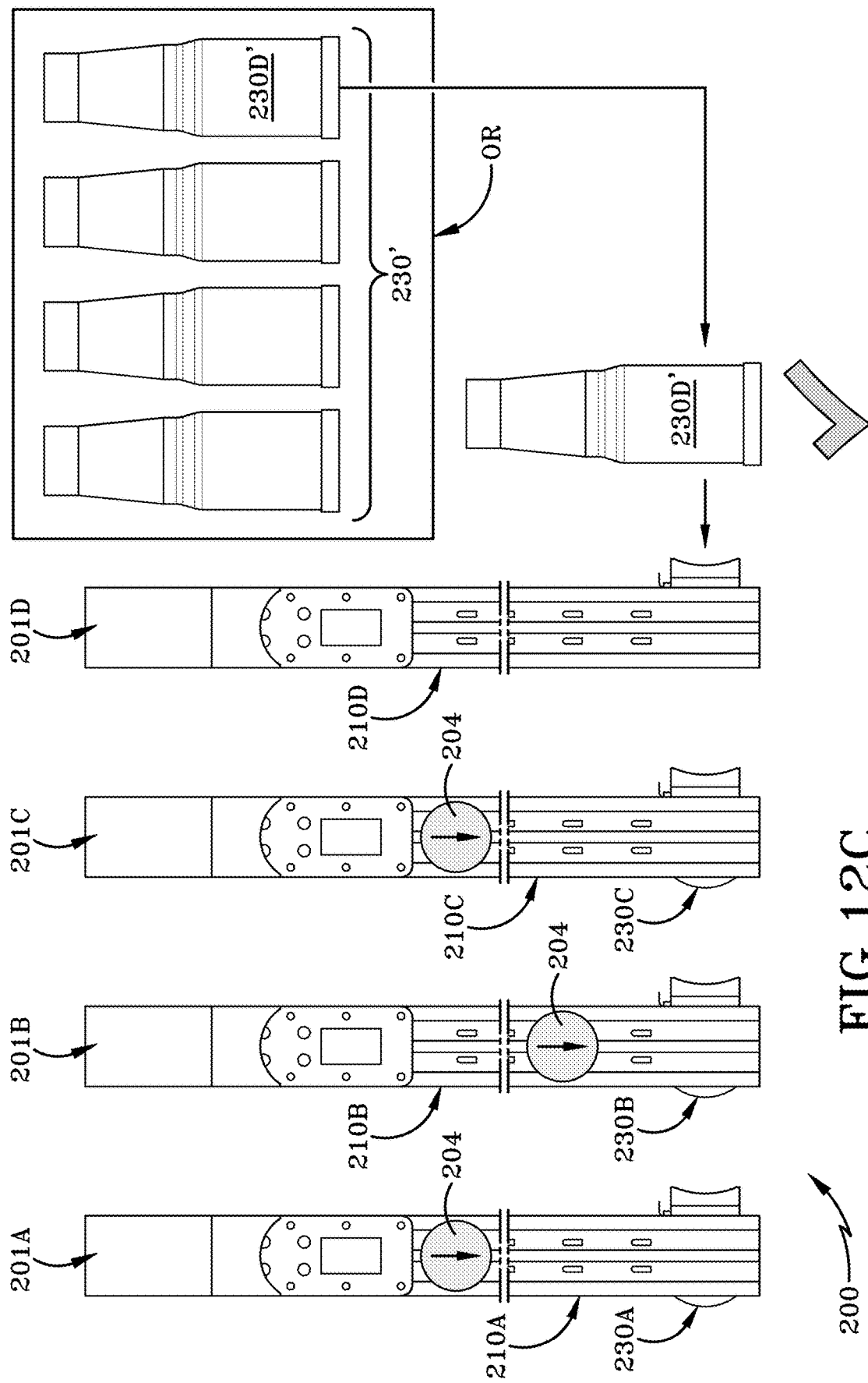
FIG. 12C is another operational view similar to FIG. 12B, but an operative air supply unit is introduced and engaged with the tray of the corresponding can blank conveyor.
Figure 12D:
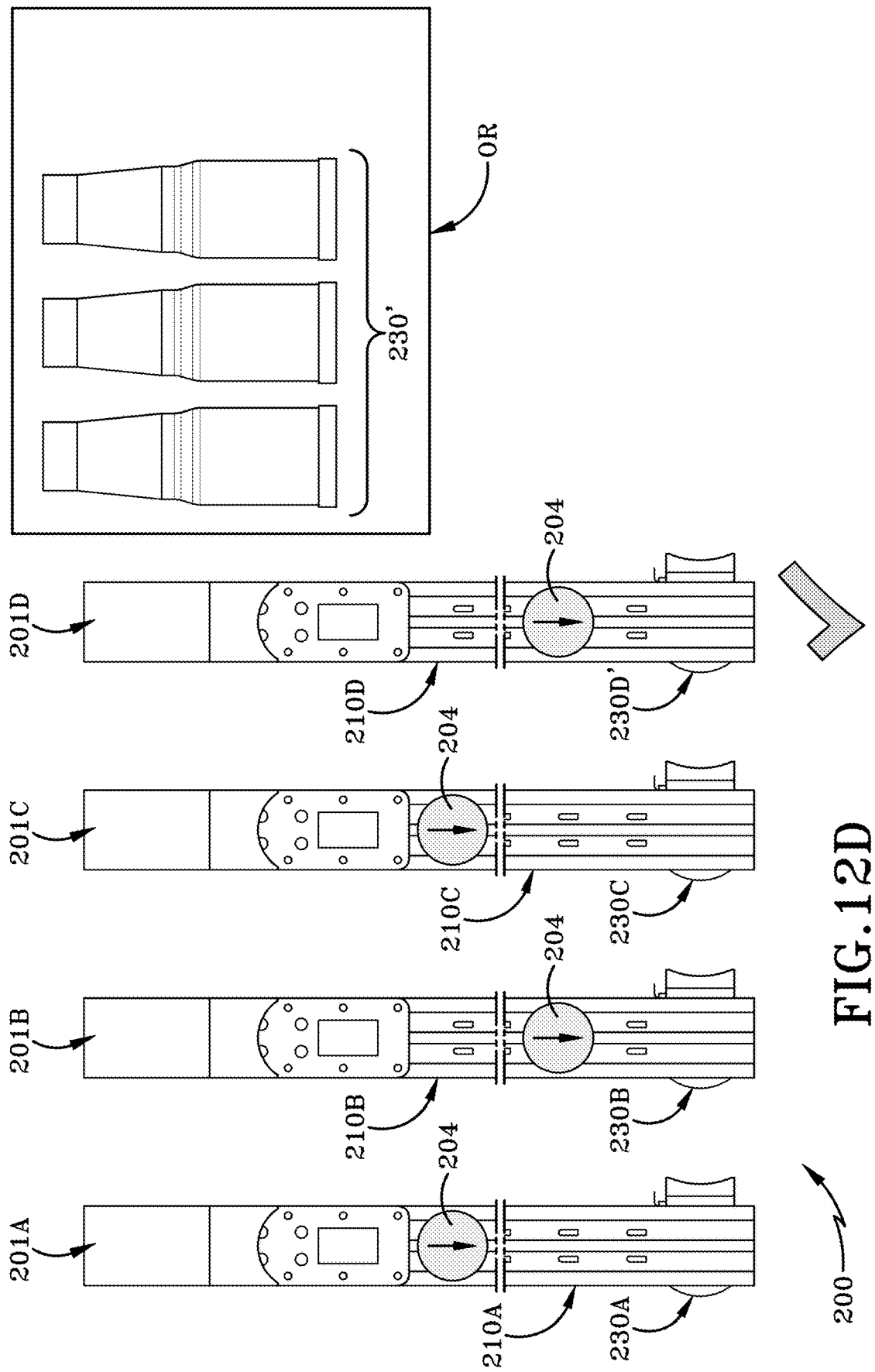
FIG. 12D is another operational view similar to FIG. 12C, but the can blank conveyor is now operative with the operative air supply unit.

In the present disclosure, the fourth can blank conveyor 201D is shown as malfunctioning and/or in need of service due to the fourth air supply unit 201D being inoperative; such malfunction of the fourth can blank conveyor 201D is denoted by an "X" shown in FIGS. 12A-12B. In this instance, an operator or technician of the fourth can blank conveyor 201D may disengage and remove the inoperative fourth air supply unit 230D from the fourth tray 210D (see FIG. 12B); such actions of disengaging of the inoperative fourth air supply unit 230D from the fourth tray 210D is identical to the actions of disengaging the air supply unit 30 from the tray 10 as discussed above.

Once the inoperative fourth air supply unit 230D is removed from the fourth tray 210D, the operator may retrieve a spare fourth air supply unit 230D' from a set of spare air supply units 230'. The fourth can blank conveyor 230D' is denoted with a checkmark in FIG. 12C to signify that fourth can blank conveyor 230D' is operative. In the present disclosure, the set of spare air supply units 230' is stored in a storage area or on-reserve area (denoted "OR" in FIGS. 12A-12D) that may be near or remote from the can blank conveyor system 200. In the present disclosure, four spare air supply units 230' are stored in the storage area due to the can blank conveyor system 200 having four can blank conveyors 201A, 201B, 2010, 201D in operation. It should be understood that users of the can blank conveyor system 200 may store and/or stock any suitable number of spare air supply units based on various reasons, including the number of can blank conveyors being used in operation, the size of the storage area, and other various considerations.

Once the operator retrieves the spare fourth air supply unit 230D', the operator may then introduce and engage the spare fourth air supply unit 230D' with the fourth tray 210D (see FIG. 12C); such actions of engaging of the spare fourth air supply unit 230D' with the fourth tray 210D is identical to the actions of engaging the air supply unit 30 with the tray 10 as discussed above. Once engaged, the spare fourth air supply unit 230D' may be initiated to deliver air into fourth tray 210D for transporting a plurality of can blanks 204 (see FIG. 12D); such operation of the fourth can blank conveyor 201D denoted with a checkmark in FIG. 12D.

Figure 13:
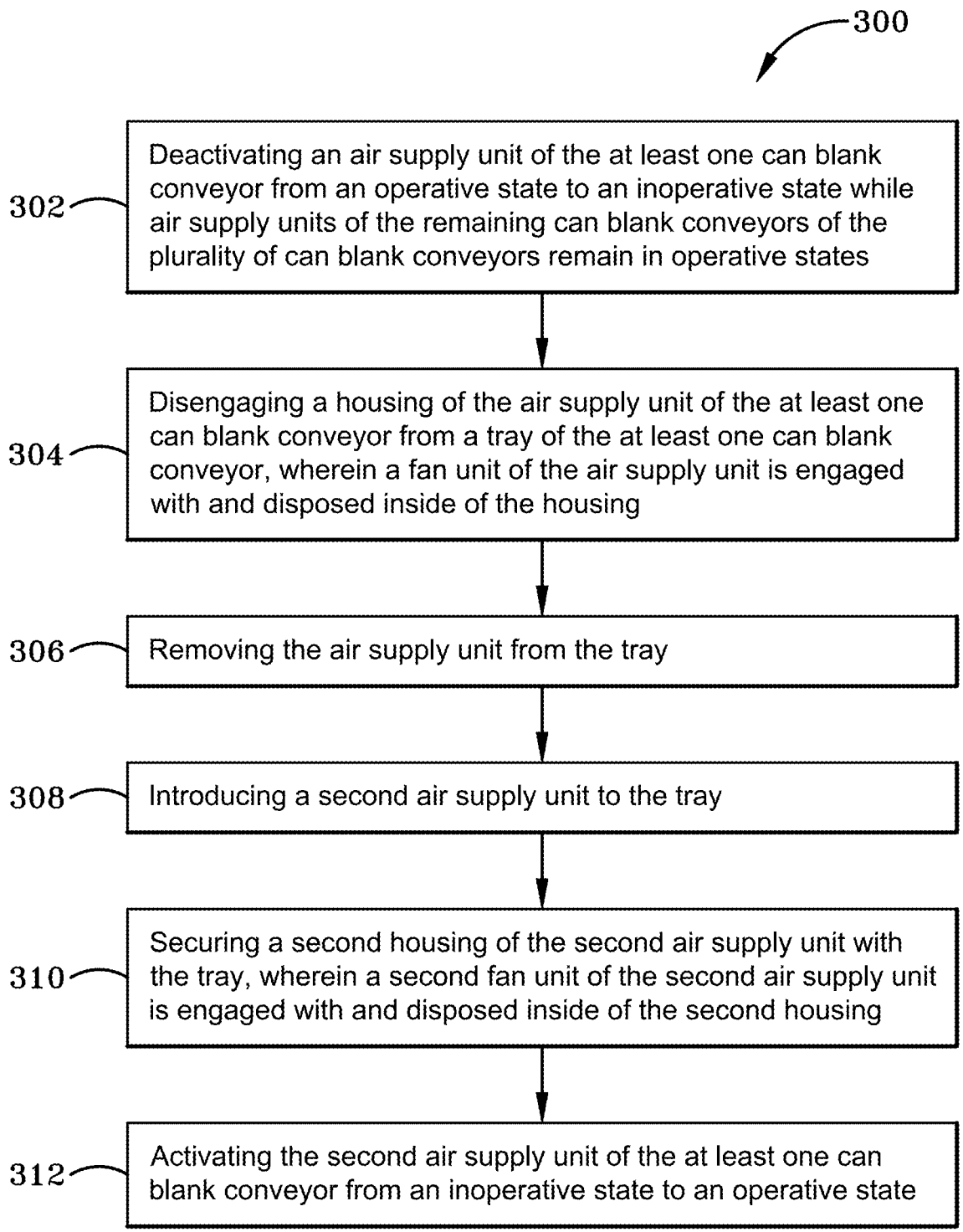
FIG. 13 is a method flowchart of replacing an air supply unit of a can blank conveyor.

FIG. 13 is a method 300 of repairing at least one can blank conveyor of a plurality of can blank conveyors. An initial step 302 of method 300 may include deactivating an air supply unit of the at least one can blank conveyor from an operative state to an inoperative state while air supply units of the remaining can blank conveyors of the plurality of can blank conveyors remain in operative states. Another step 304 of method 300 may include disengaging a housing of the air supply unit of the at least one can blank conveyor from a tray of the at least one can blank conveyor, wherein a fan unit of the air supply unit is engaged with and disposed inside of the housing. Another step 306 of method 300 may include removing the air supply unit from the tray. Another step 308 of method 300 may include introducing a second air supply unit of a plurality of air supply units to the tray. Another step 310 of method 300 may include securing a second housing of the second air supply unit with the tray, wherein a second fan unit of the second air supply unit is engaged with and disposed inside of the second housing. Another step 312 of method 300 may include activating the second air supply unit of the at least one can blank conveyor from an inoperative state to an operative state.

In other exemplary embodiment, optional and/or further steps may be included with method 300. An optional step may include suspending the second air supply unit from an inlet tube of the tray. Another optional step may include that the step of securing a second housing of the second air supply unit with the tray further includes releasably engaging a connector of the conveyor with the second housing of the second air supply unit. Another optional step may include directing air flow from an inlet opening defined in the housing, by an inlet cone, to the second fan unit. Another optional step may include directing air flow from the second fan unit to an outlet opening defined in the housing by an outlet cone.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A system of can blank conveyors for conveying a plurality of can blanks, each of the can blank conveyors comprising:
   a plurality of trays, each tray of the plurality of trays having at least:
      a first end;
      a second end longitudinally opposite to the first end;
      a tray passageway defined between the first end and the second end; and
      at least one set of air directors positioned longitudinally between the first end and the second end and being in fluid communication with the tray passageway and facing the second end;
   a plurality of air supply units removably engaged with the a plurality of trays at the first ends and being in fluid communication with the tray passageways, each air supply unit of the plurality of air supply units having at least:
      a housing operably engaged with the tray; and
      a fan unit disposed inside of the housing that is adapted to supply air at a predetermined rate from the housing and into the corresponding tray to convey the plurality of can blanks along the corresponding tray via the at least one set of air directors;
   wherein the at least one set of air directors of each of the can blank conveyors is configured to direct the air towards the first end of the tray to move each of the plurality of can blanks longitudinally along the tray.

2. The system of claim 1, further comprising:
   at least one spare air supply unit remote from each tray of the can blank conveyors;
   wherein the at least one spare air supply unit is replaceable with an inoperative air supply unit while remaining air supply units of the can blank conveyors remain in an operative state to convey the plurality of can blanks.

3. The system of claim 1, wherein the air supply unit is entirely suspended from the corresponding tray at a single point of support.

4. The system of claim 1, wherein the housing of the air supply unit of each of the can blank conveyors further comprises:
   an outlet end operably engaged with the tray and defining an outlet opening;

an inlet end vertically opposite to the outlet end and defining an inlet opening; and a passageway that is defined between the outlet end and the inlet end and is accessible at the outlet opening and the inlet opening;

wherein the fan unit draws the air into the passageway through the inlet end and exerts the air through the outlet end.

5. The system of claim 1, wherein the air supply unit of each of the can blank conveyors further comprises:

an inlet cone positioned vertically below the fan unit inside of the housing and vertically aligned with the fan unit; and an outlet cone positioned vertically above and vertically aligned with the inlet cone and the fan unit;

wherein the inlet cone is configured to direct the air into the fan unit in a first direction, and wherein the outlet cone is configured to direct the air exerted from the fan unit at a second direction different than the first direction.

6. The system of claim 5, wherein the inlet cone comprises:

a frame having an exterior wall operably engaged with the housing and an interior wall opposite to the exterior wall and free from engaging with the housing;

at least one support arm operably engaged with and extending from the interior wall; and a deflector operably engaged with the at least one support arm and positioned entirely inside of the frame.

7. The system of claim 6, wherein the inlet cone further comprises:

an inlet end of the deflector spaced apart from the fan unit;

an outlet end of the deflector opposite to the inlet end and positioned directly vertically below the fan unit; and a deflecting wall of the deflector that extends outwardly from the inlet end to the outlet end such that an outlet diameter defined at the outlet end is greater than an inlet diameter defined at the inlet end.

8. The system of claim 7, wherein the deflecting wall defines an arcuate shape.

9. The system of claim 5, wherein the outlet cone comprises:

a frame having an exterior wall operably engaged with the housing and an interior wall opposite to the exterior wall and free from engaging with the housing;

at least one support arm operably engaged with and extending from the interior wall; and a deflector operably engaged with the at least one support arm;

wherein a portion of the deflector is positioned entirely outside of the outer frame.

10. The system of claim 9, wherein the outlet cone further comprises:

an inlet end of the deflector positioned directly vertically above the fan unit;

an outlet end of the deflector opposite to the inlet end that is spaced apart from the fan unit and outside of the frame; and a deflecting wall that extends outwardly from the inlet end to the outlet end such that an inner diameter defined at the inlet end is greater than an outer diameter defined at the outlet end.

11. The system of claim 10, wherein the outlet cone further comprises:

a first portion defined between the inlet end and a location between the inlet end and the outlet end and operably engages with the at least one support arm; and a second portion defined between the outlet end and the location between the inlet end and the outlet end and is free from engaging with the at least one support arm;

wherein the first portion is disposed inside of the outer frame and the second portion is disposed outside of the outer frame.

12. The system of claim 4, wherein the air supply unit of each of the can blank conveyors further comprises:

a guard operably engaged with the housing at the inlet end;

wherein the guard allows the air to flow into the passageway at the inlet opening in response to the fan unit drawing the air into the passageway.

13. The system of claim 1, further comprising:

a connector releasably engaging the air supply unit of each of the can blank conveyors with the corresponding tray of each of the can blank conveyors;

wherein the connector surrounds a portion of the housing of the air supply unit and an inlet tube of the tray.

14. The system of claim 13, wherein the connector further comprises:

a sleeve operably engaging with and surrounding the portion of the housing of the air supply unit and the inlet tube of the tray; and at least one fastener releasably engaging and surrounding the portion of the housing of the air supply unit, the inlet tube of the tray, and the sleeve with one another.

15. The system of claim 1, wherein the tray each of the can blank conveyors further comprises:

a side opening defined proximate to the first end of the tray and providing communication between the tray passageway and an exterior environment surrounding the tray; and a regulator slidably moveable on the tray via a pair of tracks relative to the side opening;

wherein the regulator is configured to regulate the predetermined rate of air that enters into the passageway based on the air exiting through the side opening.

* * * * *